US012749207B2

(12) United States Patent
Koliiev et al.

(10) Patent No.: US 12,749,207 B2
(45) Date of Patent: Sep. 29, 2026

(54) ELECTRONIC DEVICE FOR GENERATING DEPTH MAP AND OPERATION METHOD THEREOF

(71) Applicant: SAMSUNG ELECTRONICS CO., LTD., Suwon-si (KR)

(72) Inventors: Serhii Koliiev, Kyiv (UA); Andrii Bugaiov, Kyiv (UA); Andrii Hyryla, Kyiv (UA); Andriy Begun, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 394 days.

(21) Appl. No.: 18/233,611

(22) Filed: Aug. 14, 2023

(65) Prior Publication Data

US 2023/0410335 A1 Dec. 21, 2023

Related U.S. Application Data

(63) Continuation of application No. PCT/KR2023/008553, filed on Jun. 20, 2023.

(30) Foreign Application Priority Data

Jun. 21, 2022 (KR) ........................ 10-2022-0075778

(51) Int. Cl.
*G06T 7/507* (2017.01)
*G06T 7/55* (2017.01)

(52) U.S. Cl.
CPC ................ *G06T 7/507* (2017.01); *G06T 7/55* (2017.01); *G06T 2207/10028* (2013.01)

(58) Field of Classification Search
CPC . G06T 7/507; G06T 7/55; G06T 2207/10028; G06T 7/557; G06T 7/586; G06T 2207/10024; G06T 2207/20081; G06T 2207/20084; G06T 7/521; G01B 11/2513; G01B 11/2518; G06V 10/14
See application file for complete search history.

(56) References Cited

U.S. PATENT DOCUMENTS 6,438,272 B1 8/2002 Huang et al.
7,545,516 B2 6/2009 Jia et al.
(Continued)

FOREIGN PATENT DOCUMENTS

CN 112825491 A * 5/2021 ............. H04N 23/80
JP 6290512 B2 3/2018
(Continued)

OTHER PUBLICATIONS

Communication dated May 14, 2025 issued by the European Patent Office in European Patent Application No. 23827496.3.
(Continued)

*Primary Examiner* — Henok Shiferaw
*Assistant Examiner* — Woo C Rhim
(74) *Attorney, Agent, or Firm* — Sughrue Mion, PLLC

(57) ABSTRACT

A method of generating a depth map corresponding to input data includes providing light to a target object in a plurality of patterns that change over time, obtaining a plurality of captured images respectively corresponding to the plurality of patterns, by photographing the target object to which the light is provided, obtaining the input data by preprocessing the plurality of captured images and generating the depth map based on the input data.

18 Claims, 22 Drawing Sheets

(56) References Cited

U.S. PATENT DOCUMENTS

| | | | | |
|---|---|---|---|---|
| 7,570,370 | B2 | 8/2009 | Steinbichler et al. | |
| 8,773,508 | B2 | 7/2014 | Daniel et al. | |
| 10,498,109 | B1 * | 12/2019 | Tsai | G01B 11/2513 |
| 11,113,832 | B2 | 9/2021 | Wadhwa et al. | |
| 11,393,112 | B2 | 7/2022 | Lee et al. | |
| 2003/0160970 | A1 | 8/2003 | Basu et al. | |
| 2007/0165246 | A1 | 7/2007 | Kimmel | |
| 2008/0118143 | A1 | 5/2008 | Gordon et al. | |
| 2008/0279446 | A1 | 11/2008 | Hassebrook et al. | |
| 2009/0238449 | A1 | 9/2009 | Zhang et al. | |
| 2013/0162811 | A1 * | 6/2013 | Song | G06T 7/001 348/93 |
| 2013/0258060 | A1 | 10/2013 | Kotake | |
| 2014/0240464 | A1 | 8/2014 | Lee | |
| 2015/0062558 | A1 * | 3/2015 | Koppal | G01B 11/2527 356/5.01 |
| 2015/0116460 | A1 * | 4/2015 | Jouet | G06T 15/50 348/46 |
| 2015/0229907 | A1 * | 8/2015 | Bridges | G01B 11/2513 348/46 |
| 2015/0304617 | A1 * | 10/2015 | Chang | H04N 13/254 348/189 |
| 2015/0304638 | A1 * | 10/2015 | Cho | H04N 23/71 348/46 |
| 2015/0312552 | A1 * | 10/2015 | Lu | H04N 17/002 348/51 |
| 2016/0261850 | A1 | 9/2016 | Debevec et al. | |
| 2017/0132790 | A1 | 5/2017 | Jeong et al. | |
| 2018/0063403 | A1 * | 3/2018 | Ryu | H05B 47/19 |
| 2018/0073873 | A1 | 3/2018 | Takao et al. | |
| 2018/0084240 | A1 * | 3/2018 | Campbell | H04N 13/254 |
| 2018/0173947 | A1 * | 6/2018 | Kang | H04N 13/239 |
| 2018/0260623 | A1 * | 9/2018 | Kang | G06F 11/3024 |
| 2019/0005711 | A1 | 1/2019 | Marin et al. | |
| 2019/0285405 | A1 | 9/2019 | Raz | |
| 2020/0007853 | A1 * | 1/2020 | Mlinar | G06T 7/521 |
| 2020/0045297 | A1 * | 2/2020 | Van Der Sijde | H04N 13/296 |
| 2020/0074698 | A1 | 3/2020 | Schaffer et al. | |
| 2020/0142069 | A1 * | 5/2020 | Onal | G01S 7/4865 |
| 2020/0286248 | A1 * | 9/2020 | Shi | G06F 18/2431 |
| 2020/0404243 | A1 * | 12/2020 | Saphier | A61C 9/0053 |
| 2021/0065390 | A1 * | 3/2021 | Lee | G06T 7/55 |
| 2021/0183089 | A1 * | 6/2021 | Wadhwa | G06T 7/557 |
| 2021/0201517 | A1 * | 7/2021 | Yang | G06T 7/33 |
| 2021/0264625 | A1 * | 8/2021 | Atanassov | G06T 7/521 |
| 2021/0273795 | A1 * | 9/2021 | Dahlberg | H04L 9/0894 |
| 2021/0295539 | A1 * | 9/2021 | Kikuchi | G06T 7/73 |
| 2021/0341620 | A1 * | 11/2021 | Raz | G01S 17/88 |
| 2021/0358211 | A1 | 11/2021 | Kim et al. | |
| 2022/0292703 | A1 * | 9/2022 | Matsumoto | H04N 13/128 |
| 2022/0353447 | A1 * | 11/2022 | Price | G02B 27/0172 |
| 2023/0177768 | A1 * | 6/2023 | Wang | G06T 17/00 345/426 |
| 2023/0410335 | A1 * | 12/2023 | Koliiev | G01B 11/2513 |
| 2025/0052564 | A1 * | 2/2025 | Song | H04N 13/254 |

FOREIGN PATENT DOCUMENTS

| | | | | |
|---|---|---|---|---|
| JP | 2021-501946 A | | 1/2021 | |
| KR | 10-0210654 | | 7/1999 | |
| KR | 100993486 B1 | * | 11/2010 | G01N 21/45 |
| KR | 10-2014-0066638 A | | 6/2014 | |
| KR | 10-2015-01 40838 A | | 12/2015 | |
| KR | 10-1624120 B1 | | 5/2016 | |
| KR | 10-2017-0027776 A | | 3/2017 | |
| KR | 10-2017-0055163 A | | 5/2017 | |
| KR | 10-2019-0124542 A | | 11/2019 | |
| KR | 20190124542 A | * | 11/2019 | H04N 23/951 |
| KR | 10-2238573 B1 | | 4/2021 | |
| KR | 10-2287472 B1 | | 8/2021 | |
| KR | 10-2022-0000430 A | | 1/2022 | |
| KR | 10-2022-0075283 A | | 6/2022 | |

OTHER PUBLICATIONS

ISR and Written Opinion (PCT/ISA/220, PCT/ISA/210, and PCT/ISA/237) issued Sep. 12, 2023 by the ISA in International Application No. PCT/KR2023/008553.

Alhashim, Ibraheem et al., "High Quality Monocular Depth Estimation via Transfer Learning", arXiv:1812.11941v2 [cs.CV], Mar. 10, 2019. (12 pages total).

Communication dated Aug. 22, 2025, issued by European Patent Office in European Patent Application No. 23827496.3.

Office Action issued Jul. 20, 2026 by the Korean Ministry of Intellectual Property for KR Patent Application No. 10-2022-0075778.

* cited by examiner

ELECTRONIC DEVICE FOR GENERATING DEPTH MAP AND OPERATION METHOD THEREOF

CROSS-REFERENCE TO RELATED APPLICATIONS

This application is a continuation of International Application No. PCT/KR2023/008553, filed on Jun. 20, 2023, in the Korean Intellectual Property Receiving Office, which is based on and claims priority to Korean Patent Application No. 10-2022-0075778, filed on Jun. 21, 2022, in the Korean Intellectual Property Office, the disclosures of which are incorporated herein by reference in their entireties.

BACKGROUND

1. Field

The disclosure relates to an electronic device for generating a depth map, and an operation method thereof. Particularly, the disclosure relates to an electronic device for generating a depth map corresponding to an object, based on images of the object, and an operation method of the electronic device.

2. Description of Related Art

Image-based depth estimation technology may be used in various fields such as robotics, virtual reality, augmented reality, navigation, or autonomous driving. The image-based depth estimation technology may be for measuring a distance based on image information, and generating a depth map based on the measured distance. A distance in an image may be obtained through sensors such as a light-detection-and-ranging (LiDAR) sensor, a structured-light (SL) sensor, or a time-of-flight (ToF) sensor, and may also be generated from binocular images through depth estimation based on a stereo matching algorithm.

Recently, with the development of deep learning, it may be possible to measure a distance, from an image of an object photographed by a single camera, and generate a depth map, based on deep learning. However, a depth map generated from an image captured by a single camera may have a low resolution.

SUMMARY

Provided an electronic device that may provide an object with light in a plurality of patterns that change over time, and generate a high-resolution depth map for the object, based on images obtained by photographing the object such that changes in the light over time are reflected, and an operation method of the electronic device.

Thus, provided is an electronic device for generating a high-resolution depth map from an image of an object captured by a single camera, and an operation method of the electronic device.

Additional aspects will be set forth in part in the description which follows and, in part, will be apparent from the description, or may be learned by practice of the presented embodiments.

According to an aspect of the disclosure, a method of generating a depth map corresponding to input data may include providing light to a target object in a plurality of patterns that change over time, obtaining a plurality of captured images respectively corresponding to the plurality of patterns, by photographing the target object to which the light is provided, obtaining the input data by preprocessing the plurality of captured images and generating the depth map based on the input data.

Each of the plurality of patterns may include a light-emitting region to which the light is provided, and a position of the light-emitting region may change over time.

Each of the plurality of patterns may include a light-emitting region to which the light is provided, and an area of at least a partial region of the light-emitting region may change over time.

An illumination of the light in each of the plurality of patterns may change over time.

The method may include obtaining a plurality of illumination images respectively corresponding to the plurality of patterns by photographing a light-emitting device configured to provide the light, where the obtaining of the input data may include obtaining the input data by preprocessing the plurality of captured images and the plurality of illumination images.

The method may include obtaining characteristic information of the light-emitting device, where the obtaining of the input data may include obtaining the input data by preprocessing the plurality of captured images, the plurality of illumination images, and the characteristic information.

The characteristic information may include information about a size of the light-emitting device.

The method may include providing sub-light to the target object and obtaining sub-characteristic information of a sub-light-emitting device configured to provide the sub-light, where the obtaining of the plurality of captured images may include obtaining the plurality of captured images by photographing the target object to which the light and the sub-light are provided and where the obtaining of the input data may include obtaining the input data by preprocessing the plurality of captured images, the plurality of illumination images, the characteristic information, and the sub-characteristic information.

The method may include comparing an intensity of an ambient illumination of the target object with an intensity of a threshold illumination, where the light may be provided to the target object based on the intensity of the ambient illumination being less than or equal to the intensity of the threshold illumination and where the threshold illumination may be a maximum illumination at which the plurality of captured images reflecting changes in the plurality of patterns that change over time are able to be obtained.

The generating of the depth map may include generating the depth map by providing a depth map generation module with the input data, and where the depth map generation module may include an autoencoder.

According to an aspect of the disclosure, an electronic device for generating a depth map corresponding to input data may include a light-emitting device configured to provide light to a target object in a plurality of patterns that change over time, a measuring device configured to obtain a plurality of captured images respectively corresponding to the plurality of patterns by photographing the target object to which the light is provided, and a memory storing one or more instructions and at least one processor configured to execute the one or more instructions stored in the memory to obtain the input data by preprocessing the plurality of captured images and generate the depth map based on the input data.

Each of the plurality of patterns may include a light-emitting region to which the light is provided and where a position of the light-emitting region changes over time.

Each of the plurality of patterns may include a light-emitting region to which the light is provided, and wherein an area of at least a partial region of the light-emitting region may change over time.

An illumination of the light in each of the plurality of patterns may change over time.

The at least one processor may be further configured to execute the one or more instructions stored in the memory to receive a plurality of illumination images that are previously captured, the plurality of illumination images being obtained by photographing the light-emitting dev and obtain the input data by preprocessing the plurality of captured images and the plurality of illumination images, where the plurality of illumination images may respectively correspond to the plurality of patterns.

The at least one processor may be further configured to execute the one or more instructions stored in the memory to receive characteristic information of the light-emitting device and obtain the input data by preprocessing the plurality of captured images, the plurality of illumination images, and the characteristic information.

The characteristic information may include information about a size of the light-emitting device.

The electronic device may include a sub-light-emitting device configured to provide sub-light to the target object, where the measuring device may be further configured to obtain the plurality of captured images by photographing the target object to which the light and the sub-light are provided and where the at least one processor may be further configured to execute the one or more instructions stored in the memory to receive sub-characteristic information of the sub-light-emitting device and obtain the input data by preprocessing the plurality of captured images, the plurality of illumination images, the characteristic information, and the sub-characteristic information.

The at least one processor may be further configured to execute the one or more instructions stored in the memory to generate the depth map by providing a depth map generation module with the input data and the depth map generation module may include an autoencoder.

According to an aspect of the disclosure, a non-transitory computer-readable recording medium may store instructions that, when executed by at least one processor, cause the at least one processor to provide light toward a target object in a plurality of patterns that change over time, obtain a plurality of captured images respectively corresponding to the plurality of patterns, by photographing the target object toward which the light is provided, obtain input data by preprocessing the plurality of captured images and generate a depth map based on the input data.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1A:
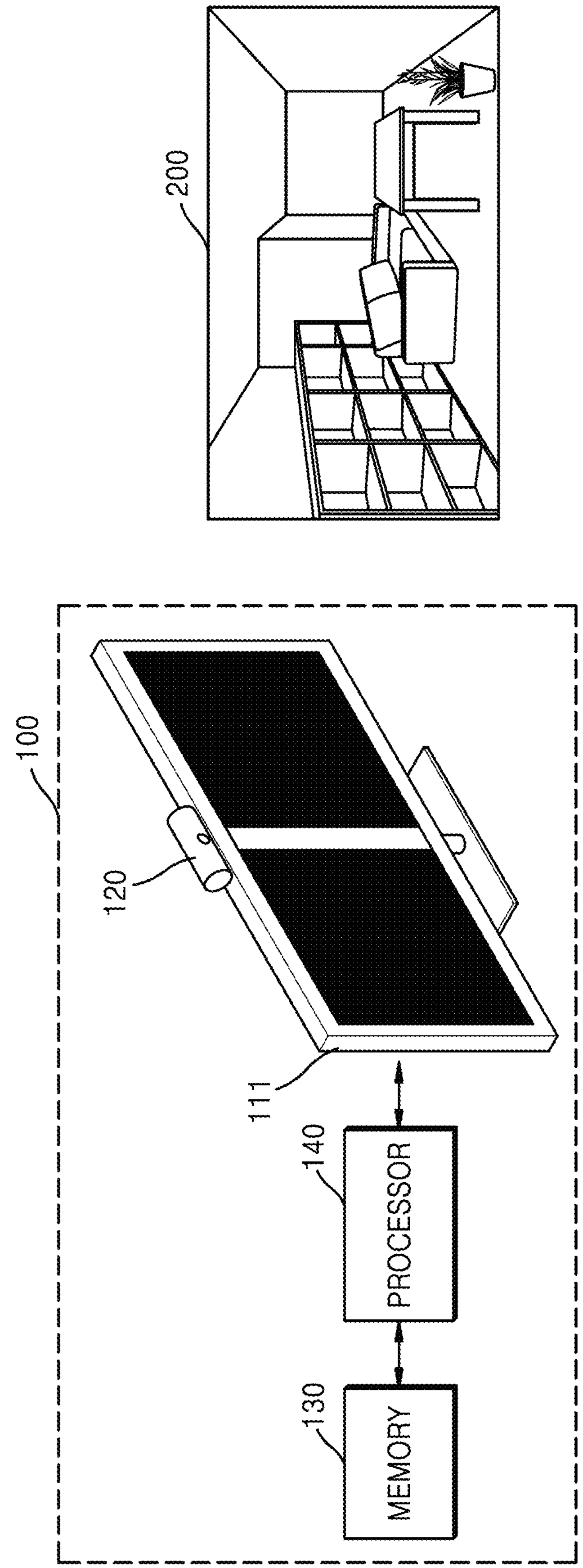
FIG. 1A is a diagram of a method of generating a depth map using an electronic device including a light-emitting device, according to an embodiment of the disclosure.

Hereinafter, example embodiments of the disclosure will be described in detail with reference to the accompanying drawings. The same reference numerals are used for the same components in the drawings, and redundant descriptions thereof may be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Although the terms used herein are selected from among common terms that are currently widely used in consideration of their function in the disclosure, the terms may be different according to an intention of those of ordinary skill in the art, a precedent, or the advent of new technology. Also, in particular cases, the terms are discretionally selected by the applicant of the disclosure, in which case, the meaning of those terms may be described in detail in the corresponding embodiment of the disclosure. Therefore, the terms used herein are not merely designations of the terms, but the terms are defined based on the meaning of the terms and content throughout the disclosure.

The singular expression may also include the plural meaning as long as it is not inconsistent with the context. All the terms used herein, including technical and scientific terms, may have the same meanings as those generally understood by those of skill in the art.

Throughout the disclosure, the expression "at least one of a, b, or c" indicates only a, only b, only c, both a and b, both a and c, both b and c, all of a, b, and c, or variations thereof.

Throughout the specification, when a part "includes" a component, it means that the part may additionally include other components rather than excluding other components as long as there is no particular opposing recitation. In addition, as used herein, terms such as " . . . er (or)", " . . . unit", " . . . module", etc., denote a unit that performs at least one function or operation, which may be implemented as hardware or software or a combination thereof.

As used herein, the expression "configured to" may be interchangeably used with, for example, "suitable for", "having the capacity to", "designed to", "adapted to", "made to", or "capable of", according to a situation. The expression "configured to" may not imply only "specially designed to" in a hardware manner. Instead, in a certain circumstance, the expression "a system configured to" may indicate the system "capable of" together with another device or components. For example, "a processor configured (or set) to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory.

Also, in the disclosure, it should be understood that when components are "connected" or "coupled" to each other, the components may be directly connected or coupled to each other, but may alternatively be connected or coupled to each other with a component therebetween, unless specified otherwise.

In addition, the term 'augmented reality device' may denote a device capable of creating 'augmented reality', and includes not only augmented reality glasses resembling eyeglasses that are typically worn on a user's face but also head-mounted display (HMD) apparatuses and augmented reality helmets that are worn on the user's head, or the like. However, the disclosure is not limited thereto, and the augmented reality device may be implemented as various electronic devices such as a mobile device, a smart phone, a laptop computer, a desktop computer, a tablet personal computer (PC), an electronic book terminal, a digital broadcasting terminal, a personal digital assistant (PDA), a portable multimedia player (PMP), a navigation system, an MP3 player, a camcorder, an internet protocol television (TV) (IPTV), a digital television (DTV), a wearable device, and the like.

In the disclosure, a 'target object' may refer to an object for which a depth map is to be generated using an electronic device. The target object may vary depending on environments surrounding a user using the electronic device. The target object may be an object in an environment in which a light-emitting device provides light (e.g., emits light toward) and a measuring device captures images, among the environments surrounding the electronic device. The target object may include one or more objects. Other variations or implantations of the target object may be realized by one of skill in the art from the disclosure herein, and the 'target object' is not necessarily limited to the objects that are described herein.

Hereinafter, an embodiment of the disclosure will be described in detail with reference to the accompanying drawings to allow those of skill in the art to easily carry out the embodiment. The disclosure may, however, be embodied in many different forms and should not be construed as being limited to an embodiment of the disclosure set forth herein.

Figure 1B:
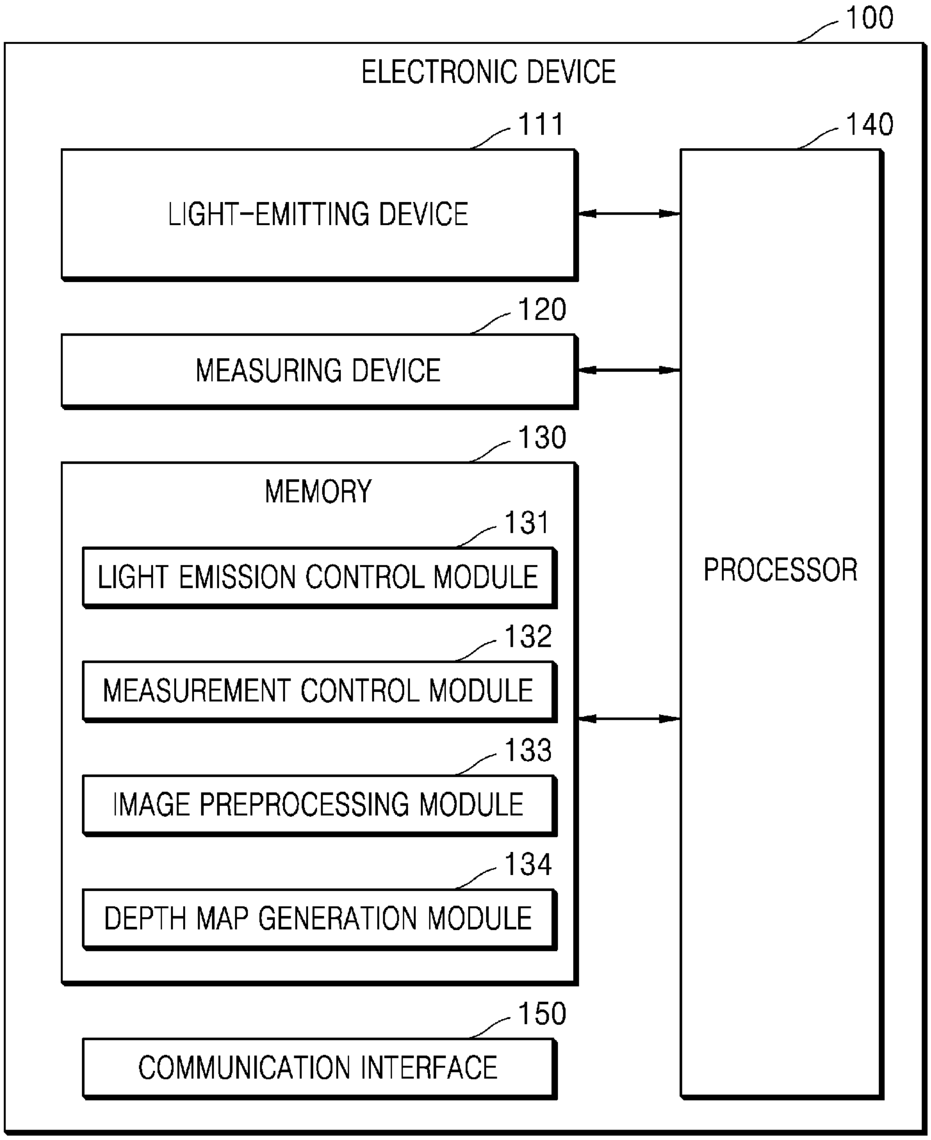
FIG. 1B is a diagram of an electronic device including a light-emitting device according to an embodiment of the disclosure.

FIG. 1A is a diagram of a method of generating a depth map using an electronic device including a light-emitting device, according to an embodiment of the disclosure. FIG. 1B is a diagram of an electronic device including a light-emitting device according to an embodiment of the disclosure. In the following description of FIGS. 1A and 1B, reference is made to aspects of FIGS. 2A, 2B, 3A, 3B, 3C, 3D, 4, 5B, 5C, 5D and 6. Further description of FIGS. 2A, 2B, 3A, 3B, 3C, 3D, 4, 5A, 5B, 5D and 6 is provided later in the disclosure.

Referring to FIG. 1A, an electronic device 100 according to an embodiment of the disclosure may be a device capable of providing light to a target object 200 and photographing the target object 200. As an example of the disclosure, the electronic device 100 may be a device such as a smart phone, a TV, a notebook computer, or an augmented reality device, but is not limited thereto. As described herein, the electronic device 100 may include a light-emitting device and/or other components may be configured to provide an object with light/sub-light, and such providing of light may also be referred to as emitting light toward/to the object, projecting light toward the object, illuminating the object, etc.

In an embodiment of the disclosure, the electronic device 100 includes a light-emitting device 111 configured to provide light to the target object 200, a measuring device 120 configured to photograph the target object 200, a memory 130 storing one or more instructions, and a processor 140 configured to execute the one or more instructions stored in the memory 130. However, FIG. 1A illustrates only some components for describing an operation of the electronic device 100, and components included in the electronic device 100 are not limited those illustrated in FIG.

1A. As an example of the disclosure, the target object 200 may be an object for which a depth map is generated using the electronic device 100. As an example of the disclosure, the target object 200 may include one or more objects. The arrangements and shapes of the objects included in the target object 200 may vary.

In an embodiment of the disclosure, the light-emitting device 111 may provide the target object 200 with light in a plurality of patterns 300 (see FIG. 3A) that change over time. Although FIG. 1A illustrates that the light-emitting device 111 is a TV and the electronic device 100 includes the TV, the disclosure is not limited thereto. The light-emitting device 111 may be a device configured to provide light, such as a projector, a monitor, an illuminator, or a light-emitting element. In addition, in a case in which the electronic device 100 is a TV, the light-emitting device 111 may correspond to a display device included in the TV. In addition, in a case in which the electronic device 100 is a smart phone, the light-emitting device 111 may correspond to a screen included in the smart phone. The light provided to the target object 200 by the light-emitting device 111 has the plurality of patterns 300 that change over time. Accordingly, the shape of a shadow of the target object 200 formed by the light provided from the light-emitting device 111 may change over time in response to the plurality of patterns 300 described above.

In an embodiment of the disclosure, each of the patterns 300 may include a light-emitting region DA that provides light, and a non-light-emitting region NDA that does not provide light. When the position of the light-emitting region DA that provides the light and is included in each of the plurality of patterns 300 changes over time, the shape of the shadow of the target object 200 may change in response to the change in the position of the light-emitting region DA.

In an embodiment of the disclosure, when the area of the light-emitting region DA that provides the light and is included in each of the plurality of patterns 300 changes over time, the shape of the shadow of the target object 200 may change in response to the change in the area of the light-emitting region DA. In addition, the illumination of the light provided to the target object 200 from the light-emitting device 111 may also change over time in response to the plurality of patterns 300 described above.

In an embodiment of the disclosure, as the illumination of the light included in each of the plurality of patterns 300 changes over time, the shape of the shadow of the target object 200 may change in response to the change in the illumination of the light. In an embodiment of the disclosure, when the wavelength of the light included in each of the plurality of patterns 300 changes over time, the shape of the shadow of the target object 200 may change in response to the change in the wavelength of the light. The shape of the shadow may include a position where the shadow is formed, the size of the shadow, the shape of the shadow, and the like. In an embodiment of the disclosure, when the illumination of light provided to the target object 200 from the light-emitting device 111 changes over time, the luminance of the target object 200 may change in response to the change in the illumination of the light.

In an embodiment of the disclosure, the target object 200 may include one or more objects. The shape of a shadow of each of the objects included in the target object 200 corresponding to the plurality of patterns 300 of light and the luminance of the object may vary depending on the distance between the object and the light-emitting device 111. As an example of the disclosure, a change in the shape of a shadow and the luminance of an object at a short distance from the light-emitting device 111 may be greater than a change in the shape of a shadow and the luminance of an object at a long distance from the light-emitting device 111.

In an embodiment of the disclosure, the measuring device 120 may obtain a plurality of captured images 400 (see FIG. 4) by photographing the target object 200. The measuring device 120 may include a first camera configured to obtain a red-green-blue (RGB) image of the target object 200. In an embodiment of the disclosure, the first camera may include an RGB camera. In addition, the measuring device 120 may include a second camera configured to obtain a depth image of the target object 200. The depth image may include data related to depth information representing the distance between the measuring device 120 and the target object 200. In an embodiment of the disclosure, the second camera may include a time-of-flight camera. In an embodiment of the disclosure, the measuring device 120 may include a third camera configured to obtain an RGB image and a depth image. The third camera may include an RGB-depth camera. However, in an embodiment of the disclosure, the measuring device 120 may include only the first camera.

The measuring device 120 may obtain the plurality of captured images 400 respectively corresponding to the plurality of patterns 300, by photographing the target object 200 receiving, from the light-emitting device 111, light of the plurality of patterns 300 that change over time.

In an embodiment of the disclosure, the shapes of shadows of the target object 200 included in the plurality of captured images 400 may be different from each other. For example, the shape of a shadow of the target object 200 may change in response to the light provided in the plurality of patterns 300 that change over time, and the plurality of captured images 400 may respectively include shadows of the target object 200, which are formed by light having different patterns. In addition, in an embodiment of the disclosure, the illumination of the light provided to the target object 200 may change in response to the light provided in the plurality of patterns 300 that change over time, and the luminances of the target object 200 included in the plurality of captured images 400 may be different from each other.

In an embodiment of the disclosure, when a time period required for the light-emitting device 111 to provide light having 'n' patterns to the target object 200 is referred to as one period, the measuring device 120 may obtain 'n' captured images respectively corresponding to the 'n' patterns, by photographing the target object 200 for one period. The shapes of shadows and luminances of the target object 200 respectively included in the 'n' captured images may correspond to the light of the respective patterns. 'n' may be a natural number.

In an embodiment of the disclosure, the electronic device 100 may further include an illumination measuring device configured to photograph the light-emitting device 111. The illumination measuring device may obtain a plurality of illumination images 320 (see FIG. 5B) respectively corresponding to the plurality of patterns 300, by photographing the light-emitting device 111 providing light.

In an embodiment of the disclosure, the illumination measuring device may be a separate device from the electronic device 100. For example, the illumination images 320 obtained by photographing the light-emitting device 111 included in the electronic device 100 may be provided to the electronic device 100 from the illumination measuring device. In this case, an operation of photographing the light-emitting device 111 using the illumination measuring device may be performed before an operation of photographing the target object 200 using the measuring device

120. However, the disclosure is not limited thereto, and the operation of photographing the light-emitting device 111 using the illumination measuring device and the operation of photographing the target object 200 using the measuring device 120 may be performed simultaneously. In addition, in an embodiment of the disclosure, a plurality of previously captured illumination images 320 may be provided from an external server or nearby electronic devices through a communication interface 150 (see FIG. 1B).

In an embodiment of the disclosure, the memory 130 may store at least one of instructions, algorithms, data structures, program code, or application programs, which are readable by the processor 140. In embodiments of the disclosure, operations performed by the processor 140 may be implemented by executing the instructions, data structures, or program code stored in the memory 130. The memory 130 may store at least one of instructions, algorithms, data structures, program code, or application programs for obtaining input data 500 (FIG. 6) based on the plurality of captured images 400 obtained by the measuring device 120, and generating a depth map 600 (FIG. 6) based on the input data 500.

In an embodiment of the disclosure, the processor 140 may control the overall operation of the electronic device 100. In an embodiment of the disclosure, the processor 140 may execute one or more instructions/program code stored in the memory 130, and perform a function and/or an operation corresponding to the instructions/program code. The processor 140 may control the overall operation of the light-emitting device 111 and the measuring device 120 by executing one or more instructions or programs stored in the memory 130. The processor 140 may obtain the input data 500 by preprocessing the plurality of captured images 400 obtained through the measuring device 120. The processor 140 may generate the depth map 600 based on the input data 500. Although FIG. 1A illustrates that the electronic device 100 includes one processor 140, the disclosure is not limited thereto. The electronic device 100 may include two or more processors, and may generate a depth map using at least one of the processors.

Referring to FIG. 1B, the electronic device 100 according to an embodiment of the disclosure may include a light-emitting device 111, a measuring device 120, a memory 130, a processor 140, and a communication interface 150. The light-emitting device 111, the measuring device 120, the memory 130, the processor 140, and the communication interface 150 may be electrically and/or physically connected to each other. Hereinafter, the same reference numerals are assigned to the same components as those described above with reference to FIG. 1A, and descriptions thereof may be omitted.

The memory 130 may include, for example, at least one of flash memory-type memory, hard disk-type memory, multimedia card micro-type memory, card-type memory (e.g., secured digital (SD) or XD memory), random-access memory (RAM), static RAM (SRAM), read-only memory (ROM), electrically erasable programmable ROM (EEPROM), programmable ROM (PROM), mask ROM, flash ROM, a hard disk drive (HDD), or a solid-state drive (SSD). The memory 130 may store instructions/program code for performing a function or operation of the electronic device 100. Instructions, algorithms, data structures, program code, and application programs stored in the memory 130 may be implemented in a programming or scripting language (e.g., C, C++, Java, or an assembler).

Figure 6:
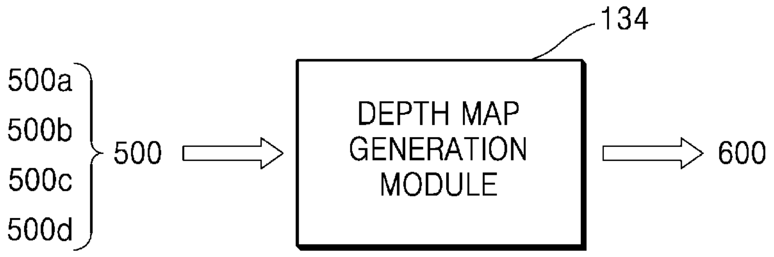
FIG. 6 is a diagram of an operation of a depth map generation module according to an embodiment of the disclosure.

In an embodiment of the disclosure, the memory 130 may include various types of modules that may be used to generate the depth map 600 (see FIG. 6) based on the input data 500 (see FIG. 6). The memory 130 may include a light emission control module 131, a measurement control module 132, an image preprocessing module 133, and a depth map generation module 134. The 'module' included in the memory 130 may refer to a unit for processing a function or operation performed by the processor 140, and may be implemented as software such as instructions, an algorithm, a data structure, or program code.

In an embodiment of the disclosure, the light emission control module 131 is configured with instructions/program code related to an operation or function of the light-emitting device 111 providing the target object 200 (see FIG. 1A) with light in the plurality of patterns 300 (see FIG. 3A) that change over time. The light emission control module 131 will be described below with reference to FIGS. 3A to 3D.

In an embodiment of the disclosure, the measurement control module 132 is configured with instructions/program code related to an operation or function, performed by the measuring device 120, of obtaining the plurality of captured images 400 (see FIG. 4) respectively corresponding to the plurality of patterns 300 by photographing the target object 200 receiving light from the light-emitting device 111. The measurement control module 132 will be described below with reference to FIG. 4.

In an embodiment of the disclosure, the image preprocessing module 133 is configured with instructions/program code related to an operation or function of obtaining input data 500*a* (see FIG. 5A) by preprocessing the plurality of captured images 400. In an embodiment of the disclosure, the image preprocessing module 133 may be configured with instructions/program code related to an operation or function of obtaining input data 500*b* (see FIG. 5B) by preprocessing the plurality of captured images 400 and the plurality of illumination images 320 (see FIG. 5B). In an embodiment of the disclosure, the image preprocessing module 133 may be configured with instructions/program code related to an operation or function of obtaining input data 500*c* (see FIG. 5C) by preprocessing the plurality of captured images 400, the plurality of illumination images 320 (see FIG. 5B), and characteristic information CI (see FIG. 5C) of the light-emitting device 111. The image preprocessing module 133 will be described below with reference to FIGS. 5A to 5C.

In an embodiment of the disclosure, the depth map generation module 134 is configured with instructions/program code related to an operation or function of generating the depth map 600 based on the input data 500. In an embodiment of the disclosure, the depth map generation module 134 may be an artificial intelligence model. In an embodiment of the disclosure, the depth map generation module 134 may include an autoencoder model. The operation and training of the depth map generation module 134 will be described below with reference to FIGS. 6 to 9. In the following embodiment of the disclosure, the operation of the electronic device 100 may be implemented by the processor 140 executing modules included in the memory 130.

For example, the processor 140 may include at least one of a CPU, a microprocessor, a graphics processing unit (GPU), an application processor (AP), an application-specific integrated circuit (ASIC), a digital signal processor (DSP), a digital signal processing device (DSPD), a programmable logic device (PLD), a field-programmable gate array (FPGA), or a neural processing unit or a dedicated artificial intelligence processor designed with a hardware structure specialized for training and processing of an artificial intelligence model, but is not limited thereto.

In an embodiment of the disclosure, the communication interface 150 may perform data communication with an external server, under control by the processor 140. Also, the communication interface 150 may perform data communication with other nearby electronic devices, in addition to the external server. The communication interface 150 may perform data communication with a server or other nearby electronic devices using at least one of data communication schemes including, for example, wired local area network (LAN), wireless LAN, Wi-Fi, Bluetooth, ZigBee, Wi-Fi Direct (WFD), Infrared Data Association (IrDA), Bluetooth Low Energy (BLE), near-field communication (NFC), wireless broadband internet (WiBro), Worldwide Interoperability for Microwave Access (WiMAX), Shared Wireless Access Protocol (SWAP), Wireless Gigabit Alliance (WiGig), and radio-frequency (RF) communication. The communication interface 150 according to an embodiment of the disclosure may transmit and receive data for generating the depth map 600 based on the input data 500, to and from an external server or nearby electronic devices. In an embodiment of the disclosure, the communication interface 150 may receive, from an external server or nearby electronic devices, the depth map generation module 134 trained to generate the depth map 600 based on the input data 500.

Figure 2A:
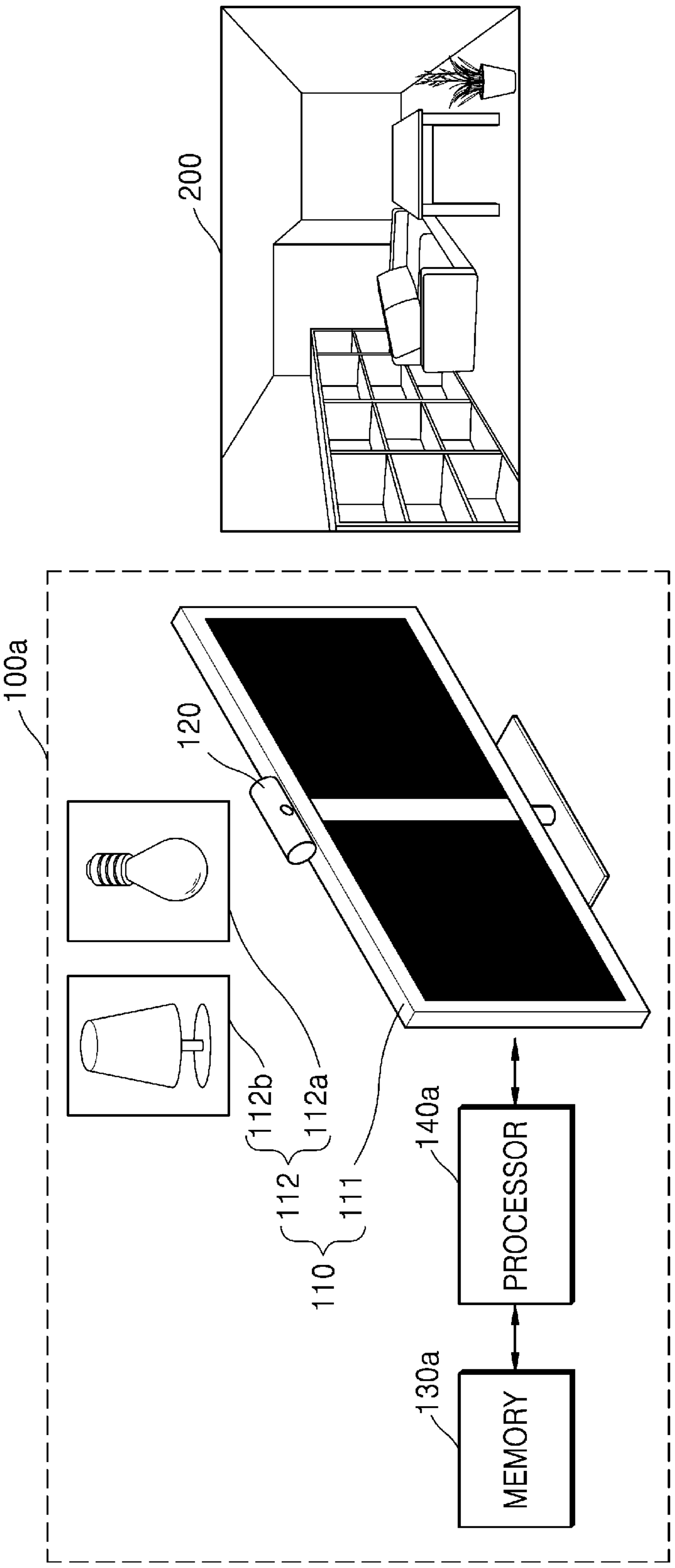
FIG. 2A is a diagram of a method of generating a depth map using an electronic device including a light-emitting device and a sub-light-emitting device, according to an embodiment of the disclosure.

FIG. 2A is a diagram of a method of generating a depth map using an electronic device including a light-emitting device and a sub-light-emitting device, according to an embodiment of the disclosure.

Referring to FIG. 2A, an electronic device 100*a* includes a light-emitting module 110, a measuring device 120 configured to photograph the target object 200, a memory 130*a* storing one or more instructions, and a processor 140*a* configured to execute the one or more instructions stored in the memory 130*a*. Hereinafter, the same reference numerals are assigned to the same components as those described above with reference to FIG. 1A, and descriptions thereof may be omitted.

In an embodiment of the disclosure, the light-emitting module 110 may include the light-emitting device 111 configured to provide light to the target object 200 and a sub-light-emitting device 112 configured to provide sub-light to the target object 200. In an embodiment of the disclosure, the light-emitting device 111 may include a TV, a monitor, a mobile phone display, and the like.

In an embodiment of the disclosure, the sub-light-emitting device 112 may be arranged in a space in which the light-emitting device 111 and the target object 200 are present. The sub-light-emitting device 112 may provide sub-light to the target object 200. In an embodiment of the disclosure, the sub-light-emitting device 112 may include an illuminator 112*a*, a lamp 112*b*, and the like. In addition, the sub-light-emitting device 112 may include a home appliance including a light source, such as a refrigerator, an oven, or a microwave oven. In an embodiment of the disclosure, the sub-light-emitting device 112 may perform an operation of providing or not providing sub-light to the target object 200. Unlike the light-emitting device 111, the sub-light-emitting device 112 may provide the target object 200 with sub-light in a constant pattern regardless of time. In this case, the shape of a shadow of the target object 200 and the luminance of the target object 200 may change over time due to the light provided in the plurality of patterns 300 (see FIG. 3A) and the sub-light provided in the constant pattern.

In an embodiment of the disclosure, the sub-light-emitting device 112 may be an illuminator, a lamp, or a home appliance connected to Internet of Things (IoT). The sub-light provided by the sub-light-emitting device 112 may also be provided to the target object 200 in a plurality of patterns that change over time. In this case, the shape of the shadow of the target object 200 or the luminance of the target object 200 may change over time due to the light and the sub-light each provided in a plurality of patterns. In this case, the plurality of patterns 300 in which the light-emitting device 111 provides light may be different from the plurality of patterns in which the sub-light-emitting device 112 provides sub-light. Although FIG. 2A illustrates that the light-emitting module 110 includes two sub-light-emitting devices 112*a* and 112*b*, the disclosure is not limited thereto. The light-emitting module 110 may include one sub-light-emitting device or may include three or more sub-light-emitting devices. In a case in which the light-emitting module 110 includes the sub-light-emitting device 112 in addition to the light-emitting device 111, changes in the shape of the shadow and the luminance of the target object 200 may be diverse due to the light and the sub-light provided to the target object 200. Accordingly, the resolution of the depth map 600 (see FIG. 6) generated by the depth map generation module 134 (see FIG. 1A) to be described below may increase.

In an embodiment of the disclosure, the measuring device 120 may obtain the plurality of captured images 400 (see FIG. 4) by photographing the target object 200 receiving the light from the light-emitting device 111 and the sub-light from the sub-light-emitting device 112.

Figure 2B:
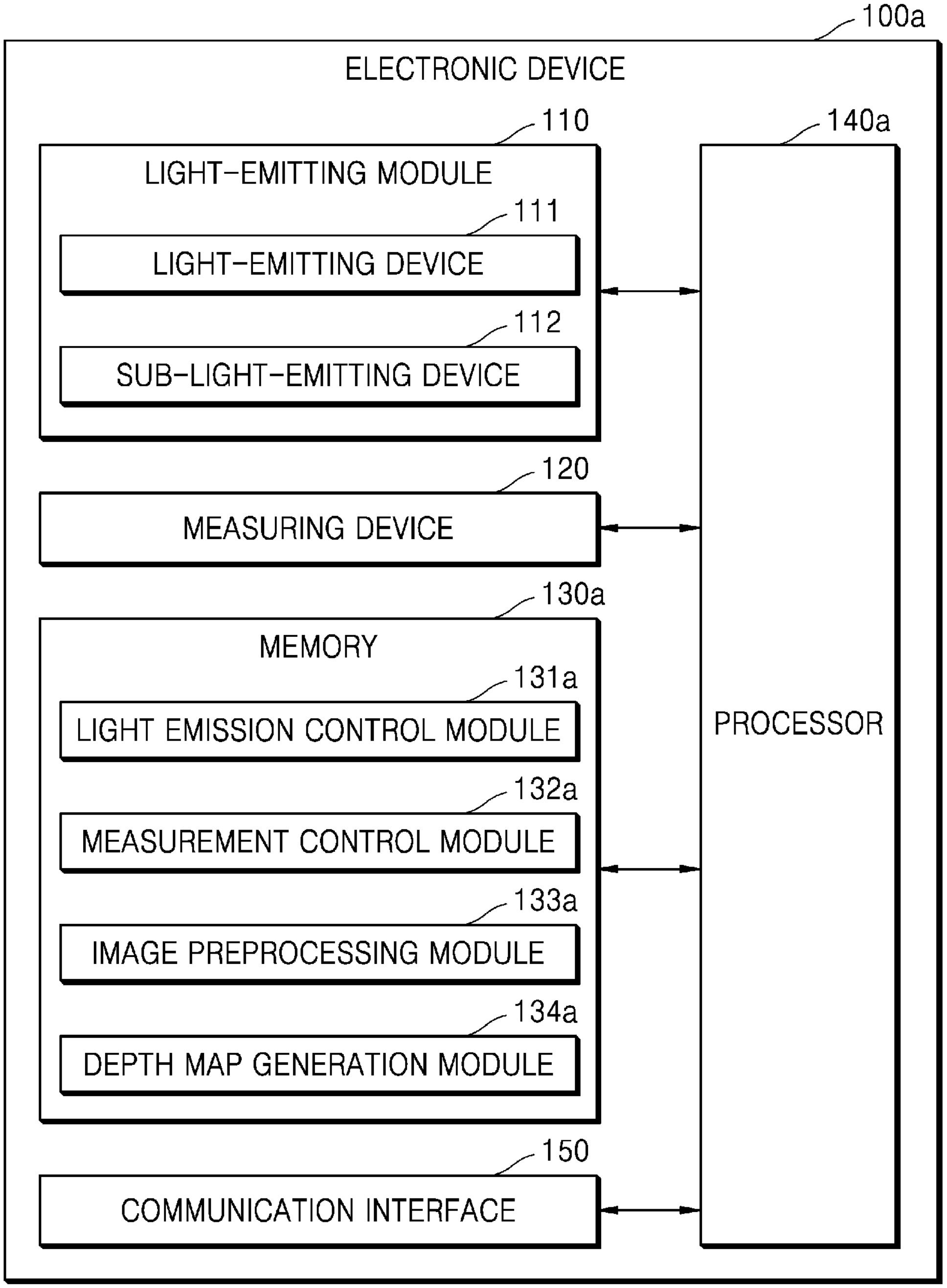
FIG. 2B is a diagram of an electronic device including a light-emitting device and a sub-light-emitting device according to an embodiment of the disclosure.

FIG. 2B is a diagram of an electronic device including a light-emitting device and a sub-light-emitting device according to an embodiment of the disclosure.

Referring to FIG. 2B, the electronic device 100*a* according to an embodiment of the disclosure may include a light-emitting module 110, a measuring device 120, a memory 130*a*, a processor 140*a*, and a communication interface 150. The light-emitting module 110, the measuring device 120, the memory 130*a*, the processor 140*a*, and the communication interface 150 may be electrically and/or physically connected to each other. Hereinafter, the same reference numerals are assigned to the same components as those described above with reference to FIG. 1B, and descriptions thereof may be omitted.

In an embodiment of the disclosure, the light-emitting module 110 includes the light-emitting device 111 configured to provide light to the target object 200 (see FIG. 2A) and the sub-light-emitting device 112 configured to provide sub-light to the target object 200.

In an embodiment of the disclosure, the memory 130*a* may include a light emission control module 131*a*, a measurement control module 132*a*, an image preprocessing module 133*a*, and a depth map generation module 134*a*.

In an embodiment of the disclosure, the light emission control module 131*a* is configured with instructions/program code related to an operation or function of the light-emitting module 110. The light emission control module 131*a* may be configured with instructions/program code related to operations or functions of the light-emitting device 111 and the sub-light-emitting device 112.

In an embodiment of the disclosure, the measurement control module 132*a* may be configured with instructions/program code related to an operation or function, performed by the measuring device 120, of obtaining the plurality of captured images 400 (see FIG. 4) by photographing the target object 200 receiving light and sub-light.

In an embodiment of the disclosure, the image preprocessing module 133*a* may be configured with instructions/program code related to an operation or function of obtaining the input data 500*a* (see FIG. 5A) by preprocessing the captured images 400. In an embodiment of the disclosure, the image preprocessing module 133*a* may be configured with instructions/program code related to an operation of function of obtaining input data by preprocessing the plurality of captured images 400, the plurality of illumination images 320 (see FIG. 5B), and the sub-illumination images obtained by photographing the sub-light-emitting device 112. In an embodiment of the disclosure, the image preprocessing module 133*a* is configured with instructions/program code related to an operation of function of obtaining input data 500*d* (see FIG. 5D) by preprocessing the plurality of captured images 400, the plurality of illumination images 320, the characteristic information CI (see FIG. 5D) of the light-emitting device 111, and sub-characteristic information SCI (see FIG. 5D) of the sub-light-emitting device 112.

In an embodiment of the disclosure, the depth map generation module 134*a* is configured with instructions/program code related to an operation or function of generating the depth map 600 based on the input data 500.

Figure 3A:
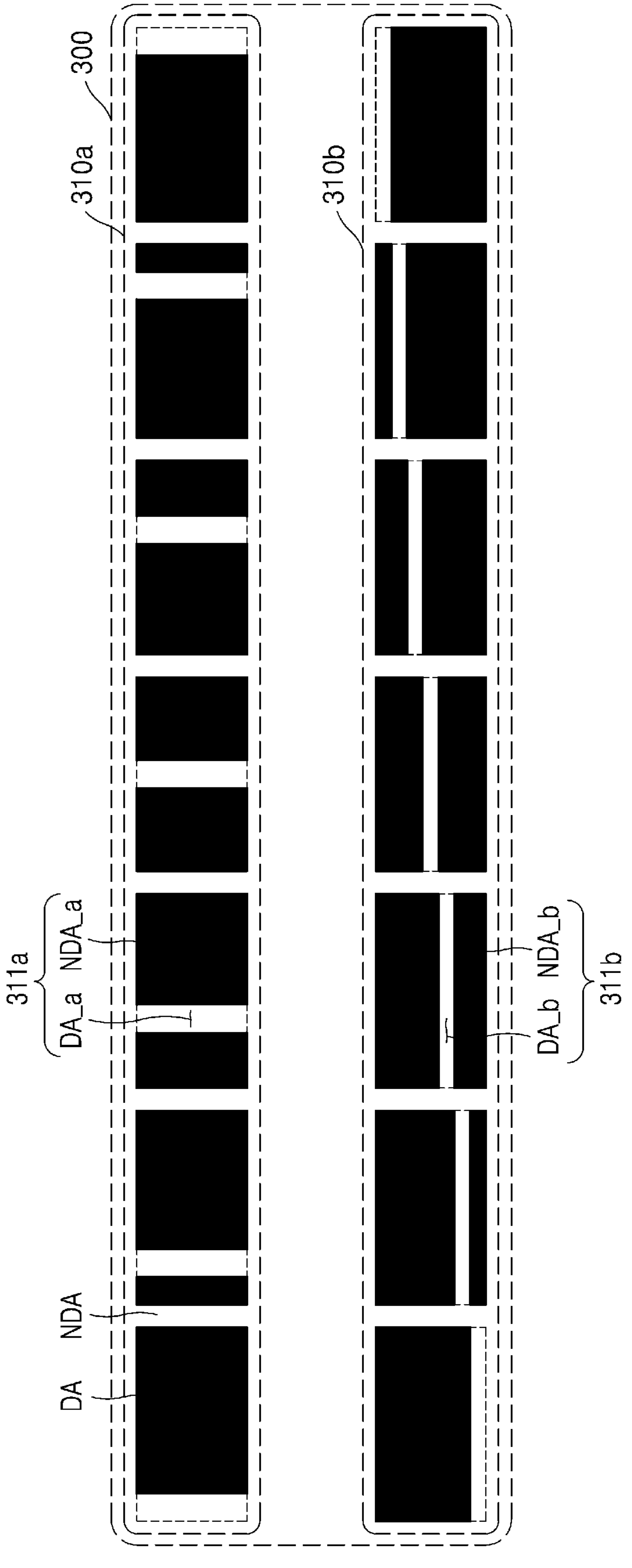
FIG. 3A is a diagram illustrating a plurality of patterns in which the position of a light-emitting region changes over time, according to an embodiment of the disclosure.

FIG. 3A is a diagram illustrating a plurality of patterns in which the position of a light-emitting region changes over time, according to an embodiment of the disclosure.

Referring to FIGS. 1A and 3A, the light-emitting device 111 may provide the target object 200 with light in the plurality of patterns 300 in which the position of the light-emitting region DA changes over time. In an embodiment of the disclosure, the plurality of patterns 300 include first patterns 310*a* in which the position of the light-emitting region DA moves in a horizontal direction over time, and second patterns 310*b* in which the position of the light-emitting region DA moves in a vertical direction over time.

In an embodiment of the disclosure, one first pattern 311*a* includes a first light-emitting region DA_a extending in the vertical direction, and a first non-light-emitting region NDA_a adjacent to the first light-emitting region DA_a. The first light-emitting region DA_a moves in the horizontal direction over time. Therefore, when the light-emitting device 111 provides the target object 200 with light in the first patterns 310*a*, a shadow of the target object 200 may be formed to move in the horizontal direction over time in response to a change in the position of the first light-emitting region DA_a.

In an embodiment of the disclosure, in a case in which the target object 200 includes at least one object, the degree to which a shadow of each object moves in the horizontal direction over time may vary depending on the distance between the light-emitting device 111 and the object. The degree to which a shadow of an object close to the light-emitting device 111 moves in the horizontal direction over time may be greater than the degree to which a shadow of an object far from the light-emitting device 111 moves in the horizontal direction over time.

In an embodiment of the disclosure, one second pattern 311*b* includes a second light-emitting region DA_b extending in the horizontal direction, and a second non-light-emitting region NDA_b adjacent to the second light-emitting region DA_b. The second light-emitting region DA_b included in one second pattern 311*b* moves in the vertical direction over time. Therefore, when the light-emitting device 111 provides the target object 200 with light in the second patterns 310*b*, a shadow of the target object 200 may be formed to move in the vertical direction over time in response to a change in the position of the second light-emitting region DA_b.

In an embodiment of the disclosure, in a case in which the target object 200 includes at least one object, the degree to which a shadow of each object moves in the vertical direction over time may vary depending on the distance between the light-emitting device 111 and the object. The degree to which a shadow of an object close to the light-emitting device 111 moves in the vertical direction over time may be greater than the degree to which a shadow of an object far from the light-emitting device 111 moves in the vertical direction over time.

Although FIG. 3A illustrates that the plurality of patterns 300 includes the first patterns 310*a* and the second patterns 310*b*, the disclosure is not limited thereto. The plurality of patterns 300 may include only the first patterns 310*a* or only the second patterns 310*b*. Also, the plurality of patterns 300 may include patterns in which the position of a light-emitting region moves in a direction intersecting a horizontal direction or a vertical direction over time.

Figure 3B:
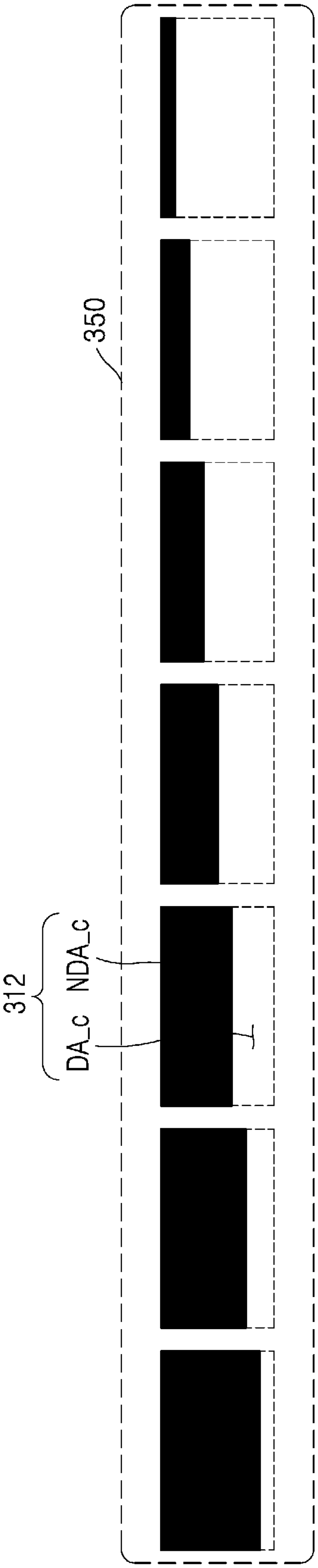
FIG. 3B is a diagram illustrating a plurality of patterns in which the area of a light-emitting region changes over time, according to an embodiment of the disclosure.

FIG. 3B is a diagram illustrating a plurality of patterns in which the area of a light-emitting region changes over time, according to an embodiment of the disclosure.

Referring to FIGS. 1A and 3B, the light-emitting device 111 may provide the target object 200 with light in the plurality of patterns 350 in which the area of the light-emitting region DA changes over time. The plurality of patterns 350 include third patterns in which the area of the light-emitting region DA changes over time. In an embodiment of the disclosure, one third pattern 312 includes a third light-emitting region DA_c extending in the horizontal direction, and a third non-light-emitting region NDA_c adjacent to the third light-emitting region DA_c. The area of the third light-emitting region DA_c changes over time. For example, the area of the third light-emitting region DA_c increases over time. Although FIG. 3B illustrates that the third light-emitting region DA_c has a shape extending in the horizontal direction and the shape of the third light-emitting region DA_c increases in the vertical direction over time, the disclosure is limited thereto. Each of the plurality of patterns 300 may include the light-emitting region DA having a shape that extends in the vertical direction and increases in the horizontal direction over time.

In an embodiment of the disclosure, the plurality of patterns 350 may include patterns in which the shape of the light-emitting region DA changes in the vertical direction over time, and patterns in which the shape of the light-emitting region DA changes in the horizontal direction over time. In an embodiment of the disclosure, the light-emitting region DA included in the plurality of patterns 350 may have a particular shape, for example, a quadrangle, a triangle, a trapezoid, or a circle, the size of which may change over time. When the light-emitting device 111 provides the target object 200 with light in the plurality of patterns 350 in which the area of the light-emitting region DA changes over time, the shape of a shadow of the target object 200 may change in response to a change in the area of the light-emitting region DA.

In an embodiment of the disclosure, in a case in which the target object 200 includes at least one object, the degree to which the shape of a shadow of each object changes over time may vary depending on the distance between the light-emitting device 111 and the object. The degree to which the shape of a shadow of an object close to the light-emitting device 111 changes over time may be greater than the degree to which the shape of a shadow of an object far from the light-emitting device 111 changes over time.

Figure 3C:
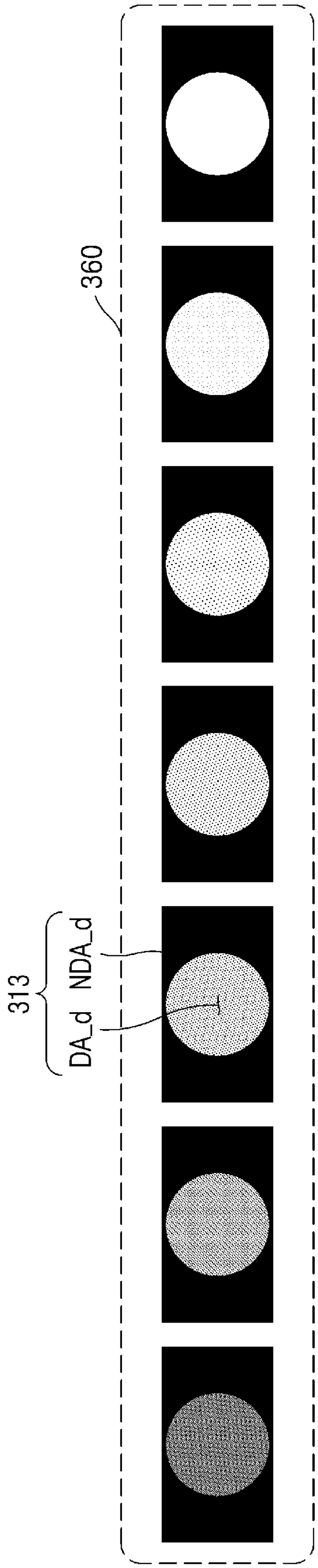
FIG. 3C is a diagram illustrating a plurality of patterns in which the illumination of light changes over time, according to an embodiment of the disclosure.

FIG. 3C is a diagram illustrating a plurality of patterns in which the illumination of light changes over time, according to an embodiment of the disclosure.

Referring to FIGS. 1A and 3C, the light-emitting device 111 may provide the target object 200 with light in the plurality of patterns 360 in which the illumination of the light changes over time. The plurality of patterns 360 include fourth patterns in which the illumination of the light changes over time.

In an embodiment of the disclosure, one fourth pattern 313 includes a fourth light-emitting region DA_d and a fourth non-light-emitting region NDA_d adjacent to the fourth light-emitting region. Although FIG. 3C illustrates that the fourth light-emitting region DA_d has a circular shape, the disclosure is not limited thereto. The fourth light-emitting region DA_d may have a polygonal shape such as a quadrangle. In addition, one fourth pattern 313 may not include the fourth non-light-emitting region NDA_d. The entire fourth pattern 313 may be a light-emitting region that provides light. The illumination of light provided from the fourth light-emitting region DA_d may change over time.

In an embodiment of the disclosure, the illumination of the light provided from the fourth light-emitting region DA_d may increase over time. When the light-emitting device 111 provides the target object 200 with light in the plurality of patterns 360 in which the illumination of the light increases over time, the shape of a shadow of the target object 200 may change in response to a change in the illumination of the light.

In an embodiment of the disclosure, when the illumination of the light provided to the target object 200 by the light-emitting device 111 increases over time, the shape of a shadow of the target object 200 may also increase over time. In an embodiment of the disclosure, in a case in which the target object 200 includes at least one object, the degree to which the shape of a shadow of each object changes over time may vary depending on the distance between the light-emitting device 111 and the object. The degree to which the shape of a shadow of an object close to the light-emitting device 111 changes over time may be greater than the degree to which the shape of a shadow of an object far from the light-emitting device 111 changes over time. In addition, when the light-emitting device 111 provides the target object 200 with light in the plurality of patterns 360 in which the illumination of the light increases over time, the luminance of the target object 200 may change in response to a change in the illumination of the light.

In an embodiment of the disclosure, when the illumination of the light provided to the target object 200 by the light-emitting device 111 increases over time, the luminance of the target object 200 may also increase over time. In an embodiment of the disclosure, in a case in which the target object 200 includes at least one object, the degree to which the luminance of each object changes over time may vary depending on the distance between the light-emitting device 111 and the object. The degree to which the luminance of an object close to the light-emitting device 111 changes over time may be greater than the degree to which the luminance of an object far from the light-emitting device 111 changes over time.

Figure 3D:
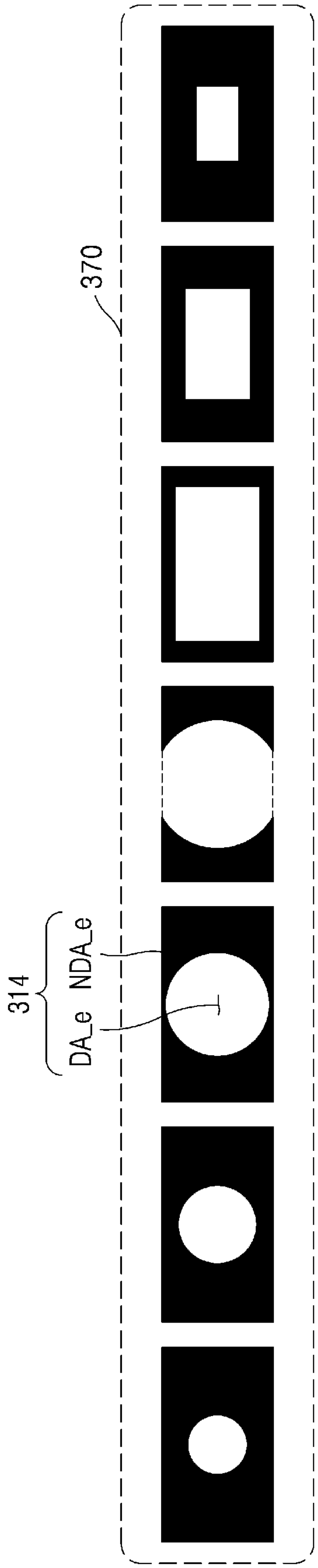
FIG. 3D is a diagram illustrating a plurality of patterns in which the shape of a light-emitting region changes over time, according to an embodiment of the disclosure.

FIG. 3D is a diagram illustrating a plurality of patterns in which the shape of a light-emitting region changes over time, according to an embodiment of the disclosure.

Referring to FIGS. 1A and 3D, the light-emitting device 111 may provide the target object 200 with light in the plurality of patterns 370 in which the shape of the light-emitting region DA changes over time. The plurality of patterns 370 include fifth patterns in which the shape of the light-emitting region DA changes over time.

In an embodiment of the disclosure, one fifth pattern 314 includes a fifth light-emitting region DA_e and a fifth non-light-emitting region NDA_e adjacent to the fifth light-emitting region. The shape of the fifth light-emitting region DA_e changes over time. Referring to FIG. 3D, the shape of the fifth light-emitting region DA_e includes a circular shape that changes in size over time, and a quadrangular shape that changes in size over time. However, the disclosure is not limited thereto. The plurality of patterns 370 may include the light-emitting region DA that changes over time into various shapes such as a circle, a quadrangle, a triangle, or a trapezoid, the size of which may also change.

In an embodiment of the disclosure, when the light-emitting device 111 provides the target object 200 with light in the plurality of patterns 370 in which the shape of the light-emitting region DA changes over time, the shape of a shadow of the target object 200 may change in response to a change in the shape of the light-emitting region DA.

In an embodiment of the disclosure, in a case in which the target object 200 includes at least one object, the degree to which the shape of a shadow of each object changes over time may vary depending on the distance between the light-emitting device 111 and the object. The degree to which the shape of a shadow of an object close to the light-emitting device 111 changes over time may be greater than the degree to which the shape of a shadow of an object far from the light-emitting device 111 changes over time.

In an embodiment of the disclosure, when the light-emitting device 111 provides the target object 200 with light in the plurality of patterns 370 in which the shape of the light-emitting region DA changes over time, the luminance of a shadow of the target object 200 may change in response to a change in the shape of the light-emitting region DA. In an embodiment of the disclosure, in a case in which the target object 200 includes at least one object, the degree to which the luminance of each object changes over time may vary depending on the distance between the light-emitting device 111 and the object. The degree to which the luminance of an object close to the light-emitting device 111 changes over time may be greater than the degree to which the luminance of an object far from the light-emitting device 111 changes over time.

In an embodiment of the disclosure, the plurality of illumination images 320 (see FIG. 5B) respectively corresponding to the plurality of patterns may be obtained using the illumination measuring device to photograph the light-emitting device 111. Patterns of light provided to the target object 200 by the light-emitting device 111 may be identified from the plurality of illumination images 320. In an embodiment of the disclosure, the electronic device 100 may receive a plurality of previously captured illumination images 320, from an external server or nearby electronic devices through the communication interface 150 (see FIG. 1B). In this case, the light emission control module 131 may be configured with instructions/program code related to an operation or function, performed by the light-emitting device 111, of providing light to the target object 200 based on the received plurality of illumination images 320.

In an embodiment of the disclosure, the light emission control module 131 (see FIG. 1B) is configured with instructions/program code related to an operation of function, performed by the light-emitting device 111, of providing the target object 200 with light in the plurality of patterns that change over time, as illustrated in FIGS. 3A to 3D. However, the disclosure is not limited thereto, and the light emission control module 131 may cause the light-emitting device 111 to provide the target object 200 with light in the plurality of patterns that may cause a change in the shape of a shadow of the target object 200 or a change in the luminance of the target object 200 over time.

Figure 4:
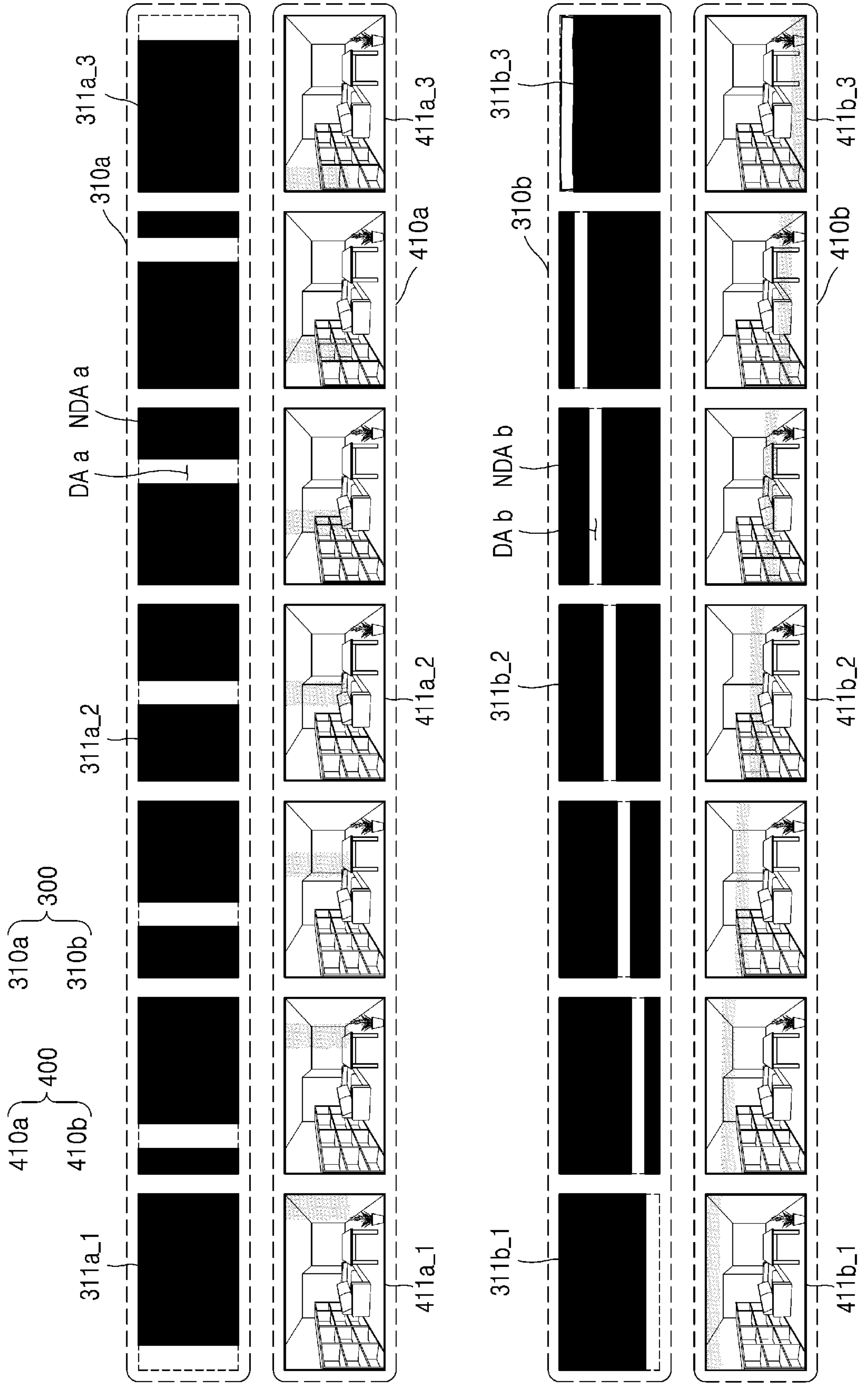
FIG. 4 is a diagram illustrating a plurality of captured images respectively corresponding to a plurality of patterns according to an embodiment of the disclosure.

FIG. 4 is a diagram illustrating a plurality of captured images respectively corresponding to a plurality of patterns according to an embodiment of the disclosure.

Referring to FIGS. 1A, 3A and 4, the measuring device 120 may obtain the plurality of captured images 400 respectively corresponding to a plurality of patterns, by photographing the target object 200 receiving light having the plurality of patterns from the light-emitting device 111. Hereinafter, the same reference numerals are assigned to the same components as those described above with reference to FIGS. 1A and 3A, and descriptions thereof may be omitted.

FIG. 4 illustrates that the light-emitting device 111 provides the target object 200 with light in the plurality of patterns 300 in which the position of the light-emitting region DA changes over time. In an embodiment of the disclosure, the plurality of patterns 300 include the first patterns 310*a* and the second patterns 310*b*. When a time period required for the light-emitting device 111 to provide the target object 200 with light having the first patterns 310*a* and the second patterns 310*b* is referred to as one period, the measuring device 120 may obtain the plurality of captured images 400 respectively corresponding to the first patterns 310*a* and the second patterns 310*b*, by photographing the target object 200 for one period.

In an embodiment of the disclosure, the plurality of captured images 400 include first captured images 410*a* respectively corresponding to the first patterns 310*a*, and second captured images 410*b* respectively corresponding to the second patterns 310*b*.

In an embodiment of the disclosure, the shape of a shadow of the target object 200 and the luminance of the target object 200 included in each of the first captured images 410*a* may change in response to a change in the position of the first light-emitting region DA_a included in each of the first patterns 310*a*.

In an embodiment of the disclosure, among the first patterns 310*a*, a pattern in which the first light-emitting region DA_a is at the left end is referred to as a first sub-pattern 311*a*_1. Among the first patterns 310*a*, a pattern in which the first light-emitting region DA_a is at the center is referred to as a second sub-pattern 311*a*_2. Among the first patterns 310*a*, a pattern in which the first light-emitting region DA_a is at the right end is referred to as a third sub-pattern 311*a*_3. Among the first captured images 410*a*, an image corresponding to the first sub-pattern 311*a*_1 is referred to as a first sub-captured image 411*a*_1. Among the first captured images 410*a*, an image corresponding to the second sub-pattern 311*a*_2 is referred to as a second sub-captured image 411*a*_2. Among the first captured images 410*a*, an image corresponding to the third sub-pattern 311*a*_3 is referred to as a third sub-captured image 411*a*_3.

In an embodiment of the disclosure, when the light-emitting device 111 provides the target object 200 with light in the first sub-pattern 311*a*_1, a shadow of the target object 200 included in the first sub-captured image 411*a*_1 has a shape extending to the right. In addition, the luminance of a left portion of the target object 200 included in the first sub-captured image 411*a*_1 is greater than the luminance of a central portion or a right portion of the target object 200. When the light-emitting device 111 provides the target object 200 with light in the second sub-pattern 311*a*_2, a shadow of the target object 200 included in the second sub-captured image 411*a*_2 has a shape extending to the center. In addition, the luminance of a central portion of the target object 200 included in the second sub-captured image 411*a*_2 is greater than the luminance of a left portion or a right portion of the target object 200. When the light-emitting device 111 provides the target object 200 with light in the third sub-pattern 311*a*_3, a shadow of the target object 200 included in the third sub-captured image 411*a*_3 has a shape extending to the left. In addition, the luminance of a right portion of the target object 200 included in the third sub-captured image 411*a*_3 is greater than the luminance of a left portion or a central portion of the target object 200.

In an embodiment of the disclosure, the shape of a shadow of the target object 200 and the luminance of the target object 200 included in each of the second captured images 410*b* may change in response to a change in the position of the second light-emitting region DA_b included in each of the second patterns 310*b*.

In an embodiment of the disclosure, among the second patterns 310*b*, a pattern in which the second light-emitting region DA_b is at the lower end is referred to as a fourth sub-pattern 311*b*_1. Among the second patterns 310*b*, a pattern in which the second light-emitting region DA_b is at the center is referred to as a fifth sub-pattern 311*b*_2. Among the second patterns 310*b*, a pattern in which the second light-emitting region DA_b is at the upper end is referred to as a sixth sub-pattern 311*b*_3. Among the second captured images 410*b*, an image corresponding to the fourth sub-pattern 311*b*_1 is referred to as a fourth sub-captured image 411*b*_1. Among the second captured images 410*b*, an image corresponding to the fifth sub-pattern 311*b*_2 is referred to as a fifth sub-captured image 411*b*_2. Among the second captured images 410*b*, an image corresponding to the sixth sub-pattern 311*b*_3 is referred to as a sixth sub-captured image 411*b*_3.

In an embodiment of the disclosure, when the light-emitting device 111 provides the target object 200 with light in the fourth sub-pattern 311*b*_1, a shadow of the target object 200 included in the fourth sub-captured image 411*b*_1 has a shape extending upward. In addition, the luminance of a lower portion of the target object 200 included in the fourth sub-captured image 411*b*_1 is greater than the luminance of a central portion or an upper portion of the target object 200. When the light-emitting device 111 provides the target object 200 with light in the fifth sub-pattern 311*b*_2, a shadow of the target object 200 included in the fifth sub-captured image 411*b*_2 has a shape extending to the center. In addition, the luminance of a central portion of the target object 200 included in the fifth sub-captured image 411*b*_2 is greater than the luminance of a lower portion or an upper portion of the target object 200. When the light-emitting device 111 provides the target object 200 with light in the sixth sub-pattern 311*b*_3, a shadow of the target object 200 included in the sixth sub-captured image 411*b*_3 has a shape extending downward. In addition, the luminance of an upper portion of the target object 200 included in the sixth sub-captured image 411*b*_3 is greater than the luminance of a lower portion or a central portion of the target object 200.

Although FIG. 4 illustrates only the plurality of captured images 400 when the light-emitting device 111 provides the target object 200 with light in the first patterns 310*a* and the second patterns 310*b*, the disclosure is not limited thereto. In an embodiment of the disclosure, when the light-emitting device 111 provides the target object 200 with light in the third to fifth patterns or other patterns that change over time, the measuring device 120 may also obtain the plurality of captured images 400 respective corresponding to the patterns.

In an embodiment of the disclosure, the measurement control module 132 (see FIG. 1B) is configured with instructions/program code related to an operation or function, performed by the measuring device 120, of obtaining the plurality of captured images 400 respectively corresponding to the plurality of patterns 300 as illustrated in FIG. 4. However, the disclosure is not limited thereto, and the measurement control module 132 may be implemented with instructions/program code to cause the measuring device 120 to obtain the plurality of captured images 400 including a change in the shape of a shadow of the target object 200 or a change in the luminance of the target object 200 that occurs in response to a plurality of various patterns 300 in which the light-emitting device 111 provides light.

Figure 5A:
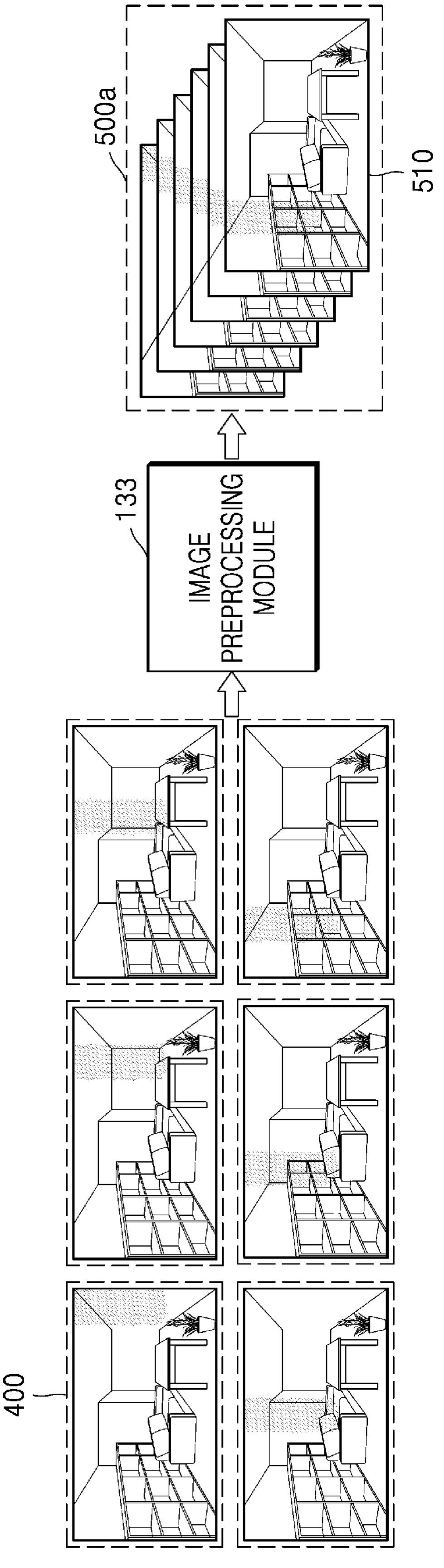
FIG. 5A is a diagram of an operation, performed by an image preprocessing module, of obtaining input data by preprocessing a plurality of captured images, according to an embodiment of the disclosure.

FIG. 5A is a diagram of an operation, performed by an image preprocessing module, of obtaining input data by preprocessing a plurality of captured images, according to an embodiment of the disclosure.

Referring to FIGS. 1B and 5A, the image preprocessing module 133 obtains the input data 500*a* by preprocessing the plurality of captured images 400. In an embodiment of the disclosure, the image preprocessing module 133 preprocesses the plurality of captured images 400 to obtain the input data 500*a* to be used by the depth map generation module 134 to generate the depth map 600 (see FIG. 6).

In an embodiment of the disclosure, the image preprocessing module 133 obtains the input data 500*a* through processes of performing wrangling, transformation, integration, and the like on the plurality of captured images 400. In an embodiment of the disclosure, in a case in which the depth map generation module 134 is configured as an artificial intelligence model, the image preprocessing module 133*a* may obtain the input data 500*a* in which epochs and batches for training the artificial intelligence model are set, by preprocessing the plurality of captured images 400. FIG. 5A illustrates that the image preprocessing module 133 preprocesses the plurality of captured images 400 to obtain the input data 500*a* including a plurality of preprocessed captured images 510.

Figure 5B:
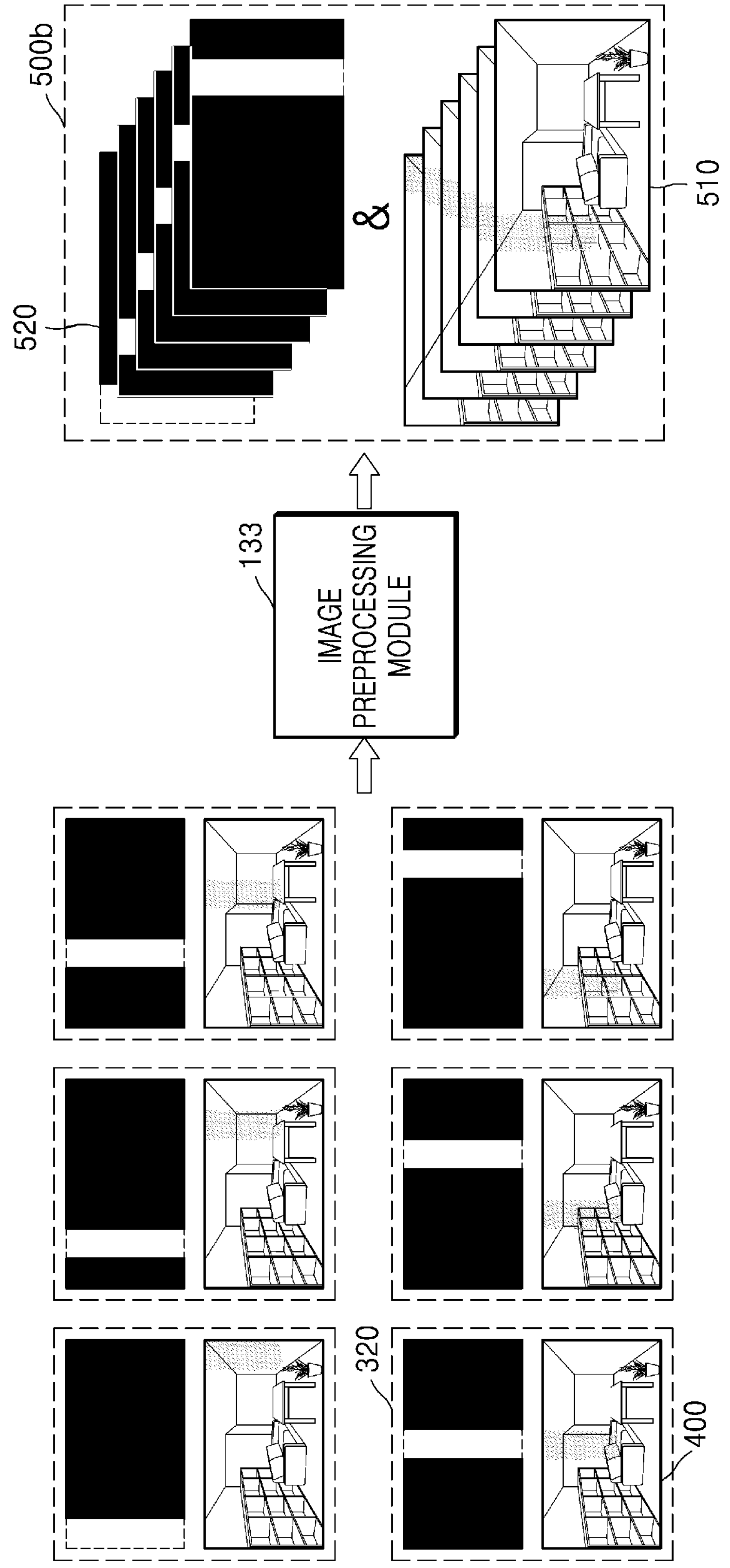
FIG. 5B is a diagram of an image preprocessing module configured to obtain input data by preprocessing a plurality of captured images and a plurality of illumination images, according to an embodiment of the disclosure.

FIG. 5B is a diagram of an image preprocessing module configured to obtain input data by preprocessing a plurality of captured images and a plurality of illumination images, according to an embodiment of the disclosure.

Referring to FIGS. 1B, 4, and 5B, the plurality of captured images 400 and the plurality of illumination images 320 may be provided to the image preprocessing module 133. In an embodiment of the disclosure, the plurality of captured images 400 may correspond to the plurality of illumination images 320, respectively. In an embodiment of the disclosure, the image preprocessing module 133 obtains the input data 500*b* by preprocessing the plurality of captured images 400 and the plurality of illumination images 320.

In an embodiment of the disclosure, the input data 500*b* includes the plurality of preprocessed captured images 510 and a plurality of preprocessed illumination images 520. The plurality of preprocessed captured images 510 may correspond to the plurality of preprocessed illumination images 520, respectively.

Figure 5C:
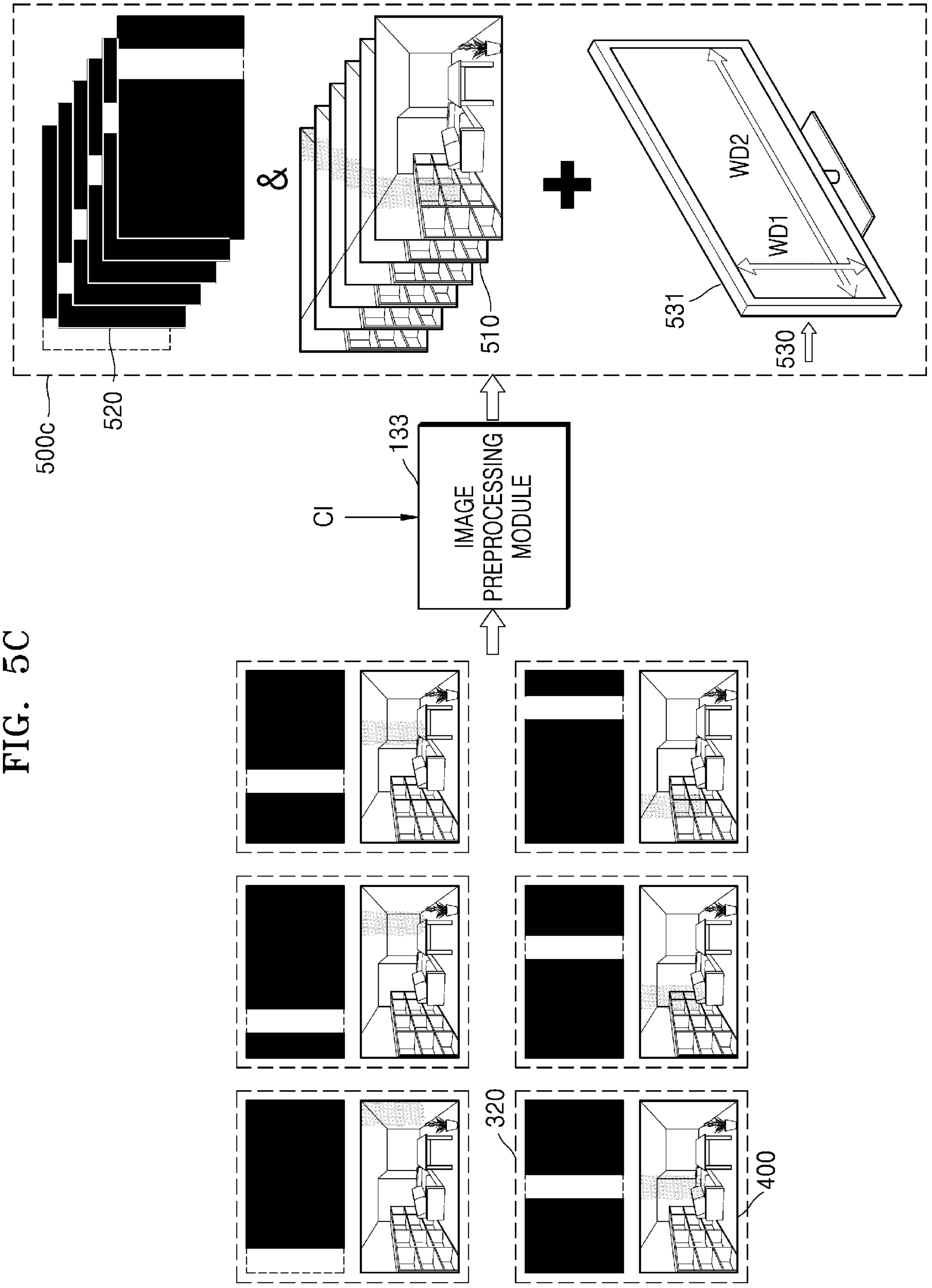
FIG. 5C is a diagram of an image preprocessing module configured to obtain input data by preprocessing a plurality of captured images, a plurality of illumination images, and characteristic information, according to an embodiment of the disclosure.

FIG. 5C is a diagram of an image preprocessing module configured to obtain input data by preprocessing a plurality of captured images, a plurality of illumination images, and characteristic information, according to an embodiment of the disclosure.

Referring to FIGS. 1A, 1B, and 5C, the plurality of captured images 400, the plurality of illumination images 320, and the characteristic information CI including information about the light-emitting device 111 may be provided to the image preprocessing module 133. In an embodiment of the disclosure, the characteristic information CI may include information about the size of the light-emitting device 111. However, the disclosure is not limited thereto. The characteristic information CI may include information about a position where the light-emitting device 111 is arranged, information about the distance between the light-emitting device 111 and the target object 200, information about the shape of the light-emitting device 111, information about the illumination of light provided by the light-emitting device 111, information about the direction of light provided by the light-emitting device 111, and the like.

In an embodiment of the disclosure, in a case in which the characteristic information CI includes information about the size of the light-emitting device 111, and the light-emitting device 111 is a TV 531, the characteristic information CI may include information about a horizontal length WD1 and a vertical length WD2 of the light-emitting device 111. However, the disclosure is not limited thereto. In a case in which the light-emitting device 111 is a device having a quadrangular shape other than a TV 531, the characteristic information CI may include information about the horizontal length WD1 and the vertical length WD2 of the light-emitting device 111. In an embodiment of the disclosure, in a case in which the light-emitting device 111 has a round shape, the characteristic information CI may include information such as the radius of the light-emitting device 111. The image preprocessing module 133 obtains the input data 500*c* by preprocessing the plurality of captured images 400, the plurality of illumination images 320, and the characteristic information CI.

In an embodiment of the disclosure, the input data 500*c* may include the plurality of preprocessed captured images 510, the plurality of preprocessed illumination images 520, and preprocessed characteristic information 530 (e.g., information about the lengths WD1 and WD2 of the TV 531).

Figure 5D:
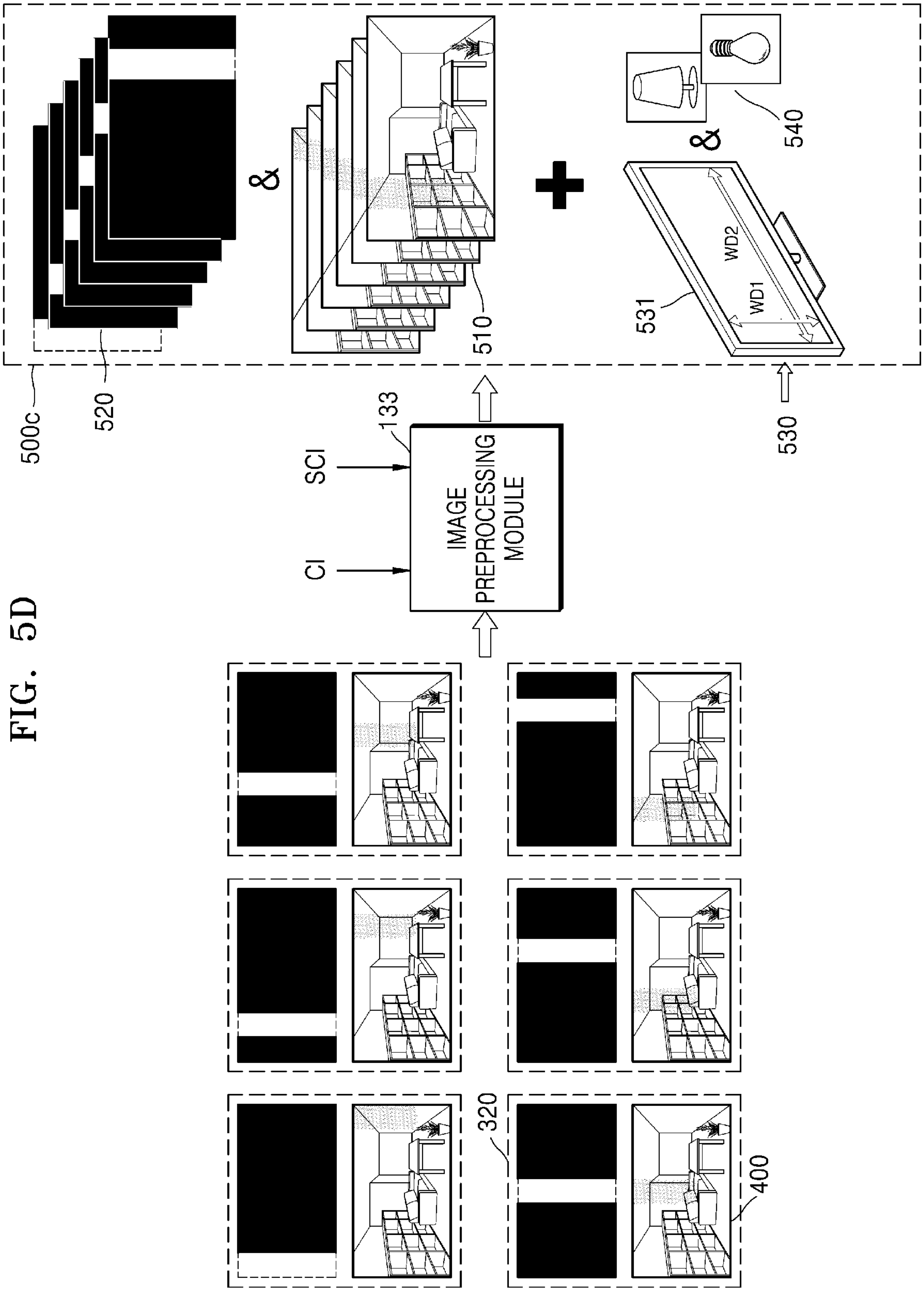
FIG. 5D is a diagram of an image preprocessing module configured to obtain input data by preprocessing a plurality of captured images, a plurality of illumination images, characteristic information, and sub-characteristic information, according to an embodiment of the disclosure.

FIG. 5D is a diagram of an image preprocessing module configured to obtain input data by preprocessing a plurality of captured images, a plurality of illumination images, characteristic information, and sub-characteristic information, according to an embodiment of the disclosure.

Referring to FIGS. 1A, 1B, and 5D, the plurality of captured images 400, the plurality of illumination images 320, the characteristic information CI, and the sub-characteristic information SCI including information about the sub-light-emitting device 112 may be provided to the image preprocessing module 133. Hereinafter, the same reference numerals are assigned to the same components as those described above with reference to FIG. 5C, and descriptions thereof may be omitted.

In an embodiment of the disclosure, the characteristic information CI may include information about the size of the light-emitting device 111.

In an embodiment of the disclosure, the sub-characteristic information SCI may include information about a position where the sub-light-emitting device 112 is arranged, information about the distance between the sub-light-emitting device 112 and the target object 200, information about the shape of the sub-light-emitting device 112, information about the illumination of light provided by the sub-light-emitting device 112, information about the direction of light provided by the sub-light-emitting devices 112, information about the number of sub-light-emitting devices 112, and the like.

In an embodiment of the disclosure, the image preprocessing module 133 obtain the input data 500*d* by preprocessing the plurality of captured images 400, the plurality of illumination images 320, the characteristic information CI, and the sub-characteristic information SCI.

In an embodiment of the disclosure, the input data 500*d* may include the plurality of preprocessed captured images 510, the plurality of preprocessed illumination images 520, the preprocessed characteristic information 530, and preprocessed sub-characteristic information 540.

FIG. 6 is a diagram of an operation of a depth map generation module according to an embodiment of the disclosure.

Referring to FIGS. 5A, 5B, 5C, 5D and 6, the depth map generation module 134 generates the depth map 600 based on the input data 500. The depth map generation module 134 generates, based on the input data 500, the depth map 600 including information related to the distance between the measuring device 120 (see FIG. 1A) and a surface of the target object 200 (see FIG. 1A).

In an embodiment of the disclosure, in a case in which the measuring device 120 is collinear with the light-emitting device 111 (see FIG. 1A), the depth map 600 may include information related to the distance between the light-emitting device 111 and the surface of the target object 200.

In an embodiment of the disclosure, the depth map generation module 134 compares the distances between pixels present in the plurality of preprocessed captured images 510 included in the input data 500 and the measuring device 120 with each other, and generate the depth map 600 representing relative distances between the pixels and the measuring device 120. The plurality of preprocessed captured images 510 include information about shadows and luminances of the target object 200 that change in response to light provided in the plurality of patterns 300 (see FIG. 3A) that change over time.

In an embodiment of the disclosure, the target object 200 may include a plurality of objects. In a case in which the distances between the objects and the light-emitting device 111 and the shapes of the objects are different from each other, the degree to which the shape of a shadow and the luminance of the target object 200 change in response to a change in the pattern of light provided from the light-emitting device 111 may vary. Accordingly, accuracy of calculating the distance between each pixel present in the plurality of preprocessed captured images 510 and the measuring device 120 may increase. Therefore, the resolution of a depth map generated using the preprocessed captured images 510 of the disclosure may be higher than the resolution of a related-art depth map generated based on images captured without changing the pattern of light provided to the target object 200.

In an embodiment of the disclosure, the depth map generation module 134 may generate the depth map 600 based on the plurality of preprocessed captured images 510 and the plurality of preprocessed illumination images 520. In this case, in generating the depth map 600, the depth map generation module 134 may accurately reflect changes in the pattern of light provided to the target object 200, thereby generating the depth map 600 with high resolution.

In an embodiment of the disclosure, the depth map generation module 134 may generate the depth map 600 based on the plurality of preprocessed captured images 510, the plurality of preprocessed illumination images 520, and the preprocessed characteristic information 530. In this case, in generating the depth map 600, the depth map generation module 134 may additionally reflect the characteristics of the light-emitting device 111, for example, the size of the light-emitting device 111, the position of the light-emitting device 111, the shape of the light-emitting device 111, the illumination of light provided by the light-emitting device 111, and the distance between the light-emitting device 111 and the target object 200, thereby generating the depth map 600 with high resolution.

In an embodiment of the disclosure, the depth map generation module 134 may generate the depth map 600 based on the plurality of preprocessed captured images 510, the plurality of preprocessed illumination images 520, the preprocessed characteristic information 530, and the preprocessed sub-characteristic information 540. In this case, in generating the depth map 600, the depth map generation module 134 may additionally reflect the characteristics of the sub-light-emitting device 112, for example, the size of the sub-light-emitting device 112, the position of the sub-light-emitting device 112, the shape of the sub-light-emitting device 112, the illumination of light provided by the sub-light-emitting device 112, and the distance between the sub-light-emitting device 112 and the target object 200, thereby generating the depth map 600 with high resolution.

Figure 7A:
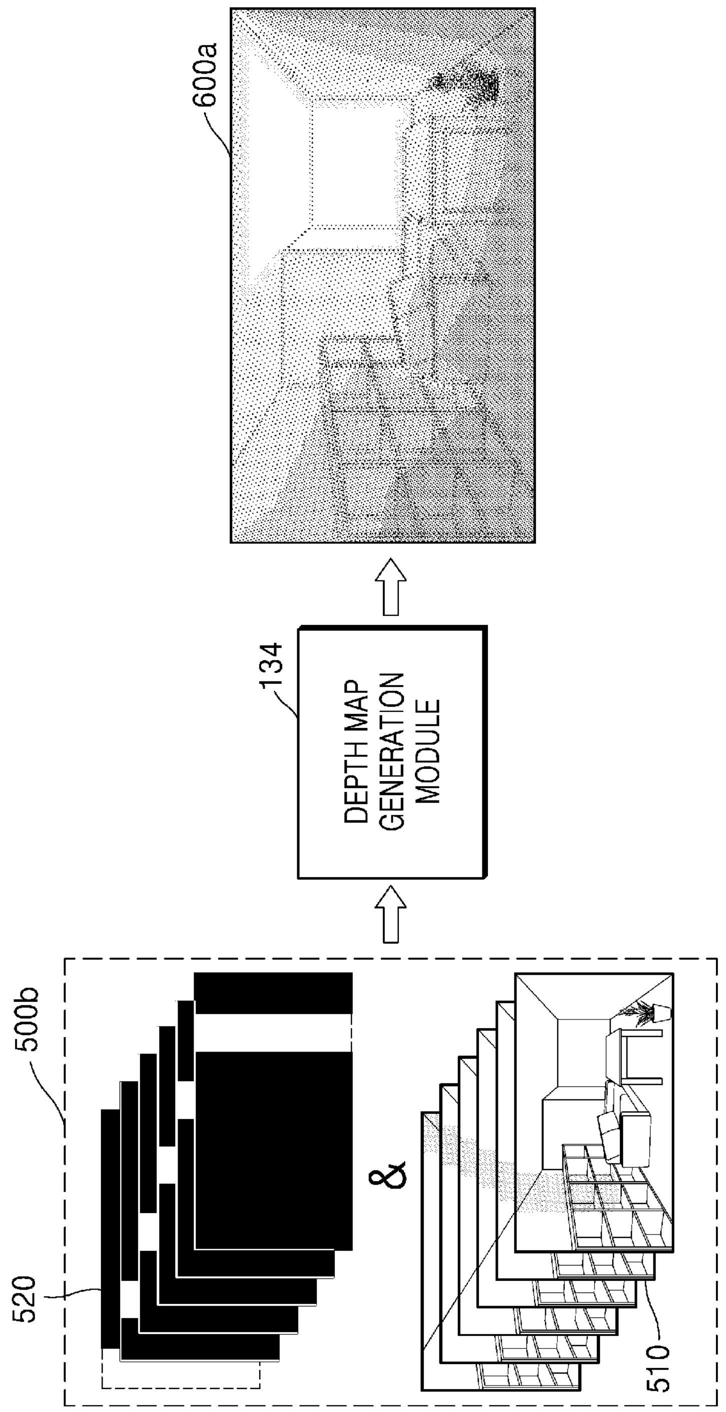
FIG. 7A is a diagram of a depth map generation module configured to generate a depth map based on input data generated by preprocessing a plurality of captured images and a plurality of illumination images, according to an embodiment of the disclosure.

FIG. 7A is a diagram of a depth map generation module configured to generate a depth map based on input data generated by preprocessing a plurality of captured images and a plurality of illumination images, according to an embodiment of the disclosure.

Referring to FIGS. 5B, 6, and 7A, the depth map generation module 134 may generate a depth map 600*a* based on the input data 500*b* including the plurality of preprocessed captured images 510 and the plurality of preprocessed illumination images 520.

In an embodiment of the disclosure, the plurality of preprocessed captured images 510 correspond to the plurality of preprocessed illumination images 520, respectively. The depth map generation module 134 may generate the depth map 600*a* with high resolution, based on the plurality of preprocessed captured images 510 including changes in the shapes of shadows and luminances of the target object 200 (see FIG. 1A) that occur in response to changes in the position of the light-emitting region DA_a (see FIG. 4) included in the plurality of preprocessed illumination images 520.

Figure 7B:
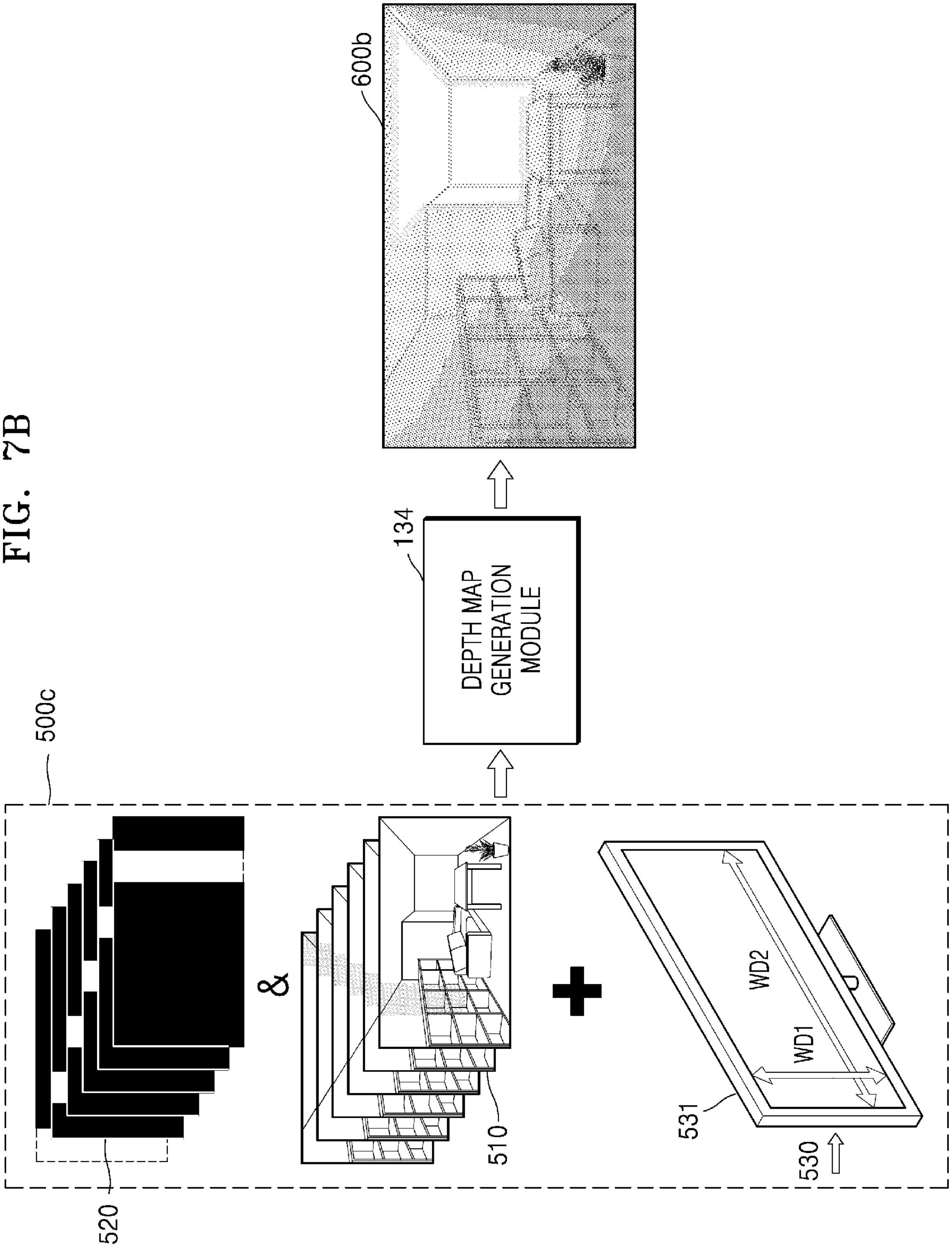
FIG. 7B is a diagram of a depth map generation module configured to generate a depth map based on input data generated by preprocessing a plurality of captured images, a plurality of illumination images, and characteristic information, according to an embodiment of the disclosure.

FIG. 7B is a diagram of a depth map generation module configured to generate a depth map based on input data generated by preprocessing a plurality of captured images, a plurality of illumination images, and characteristic information, according to an embodiment of the disclosure.

Referring to FIGS. 5C, 6, and 7B, the depth map generation module 134 may generate a depth map 600*b* based on the input data 500*c* including the plurality of preprocessed captured images 510, the plurality of preprocessed illumination images 520, and the preprocessed characteristic information 530. Although FIG. 7B illustrates that the preprocessed characteristic information 530 includes information about the size of the light-emitting device 111 (see FIG. 1A), the disclosure is not limited thereto.

In an embodiment of the disclosure, the depth map generation module 134 may generate the depth map 600*b* with high resolution, based on changes in the shapes of shadows and luminances of the target object 200 (see FIG. 1A) according to changes in the position of the light-emitting region DA_a (see FIG. 4), and characteristic information of the light-emitting device 111.

Figure 8:
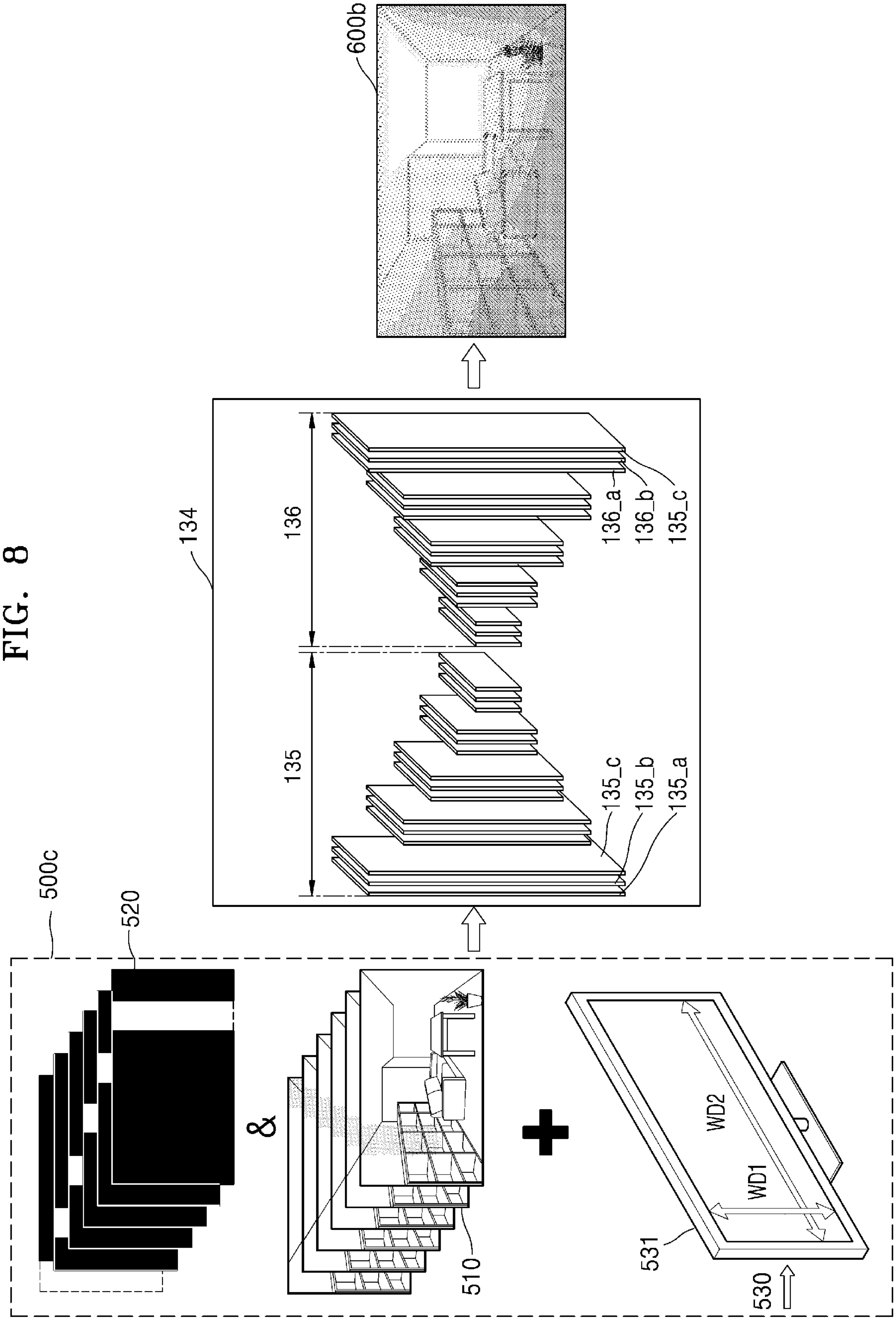
FIG. 8 is a diagram of a network structure of a depth map generation module according to an embodiment of the disclosure.

FIG. 8 is a diagram of a structure of a depth map generation module according to an embodiment of the disclosure.

Referring to FIG. 8, the depth map generation module 134 may include an artificial intelligence model. In an embodiment of the disclosure, the depth map generation module

134 may include a machine learning or deep learning model. FIG. 8 illustrates that the depth map generation module 134 is configured with an autoencoder. However, the disclosure is not limited thereto, and the depth map generation module 134 may be configured with a generative model capable of generating the depth map 600*b* based on the input data 500*c*, for example, a generative adversarial network (GAN) or a variational autoencoder (VAE).

In an embodiment of the disclosure, the depth map generation module 134 includes an encoder 135 and a decoder 136.

In an embodiment of the disclosure, encoder 135 may include at least one neural network layer. Each neural network layer may include at least one convolutional layer 135_*a* configured to perform a convolution operation, at least one activation function 135_*b* for determining activation based on input data, and at least one pooling layer 135_*c* configured to extract feature values.

In an embodiment of the disclosure, the decoder 136 may include a plurality of neural network layers. Each neural network layer may include at least one unpooling layer 136_*a* configured to obtain original data based on the extracted feature values, at least one deconvolutional layer 136_*b* configured to perform a deconvolution operation, and at least one activation function 136_*c* for determining activation based on the input data.

In an embodiment of the disclosure, the depth map generation module 134 may receive the input data 500*c* and generate the depth map 600*b*. In an embodiment of the disclosure, the input data 500*c* may include the plurality of preprocessed captured images 510, the plurality of preprocessed illumination images 520, and the preprocessed characteristic information 530. The depth map generation module 134 may obtain, based on the plurality of preprocessed illumination images 520, information about light provided to the target object 200 (see FIG. 1A) in a pattern that changes over time. In an embodiment of the disclosure, the depth map generation module 134 may obtain, based on the plurality of preprocessed captured images 510, information about the shape of a shadow and the luminance of the target object 200 that changes in response to the light provided in the pattern that changes over time.

In an embodiment of the disclosure, the depth map generation module 134 may obtain information about the size of the light-emitting device 111 (see FIG. 1A), based on the preprocessed characteristic information 530. The depth map generation module 134 may generate the depth map 600*b* of the target object 200 based on the fact that a change in the shape of a shadow of an object in response to a change in the pattern of light provided from a light source increases as the distance between the light source and the object decreases. In addition, the depth map generation module 134 may generate the depth map 600*b* of the target object 200 based on the fact that a change in the luminance of the object in response to a change in the pattern of light provided from the light source increases as the distance between the light source and the object decreases.

In an embodiment of the disclosure, in a case in which the target object 200 includes a plurality of objects, the depth map generation module 134 may obtain information that an object with a large change in the shape of a shadow in response to a change in provided light is closer to the measuring device 120 than an object with a small change in the shape of a shadow. The depth map generation module 134 may obtain information that an object with high luminance is closer to the measuring device 120 than an object with low luminance. Also, the depth map generation module 134 may obtain information that an object with a large change in the luminance in response to a change in provided light is closer to the measuring device 120 than an object with a small change in the luminance.

In an embodiment of the disclosure, the depth map generation module 134 may extract the above-described information using the encoder 135, and generate the depth map 600*b* of the target object 200 with high resolution using the decoder 136 based on the extracted information.

In an embodiment of the disclosure, in a case in which the measuring device 120 includes an RGB camera, the plurality of preprocessed captured images 510 may include RGB images of the target object 200. In this case, each of the plurality of preprocessed captured images 510 includes data of horizontal and vertical R, G, and B pixels corresponding to the size of the target object 200.

In an embodiment of the disclosure, the plurality of preprocessed illumination images 520 may include data of horizontal and vertical pixels corresponding to the gray-based light-emitting region DA (see FIG. 1A) and non-light-emitting region NDA (see FIG. 1A) representing luminance. The preprocessed characteristic information 530 may include data of the horizontal and vertical sizes of the light-emitting device 111 (e.g., TV 531).

In an embodiment of the disclosure, the depth map generation module 134 generate, based on the input data 500*c*, the depth map 600*b* including depth information and data of horizontal and vertical pixels corresponding to the size of the target object 200.

In an embodiment of the disclosure, the depth map generation module 134 may be an autoencoder that is trained, based on a training dataset, to generate the depth map 600*b* based on captured images of the target object 200.

In an embodiment of the disclosure, the training dataset may be a dataset including the plurality of captured images 400 obtained by the electronic device 100 of the disclosure. The training dataset may be a dataset including the plurality of captured images 400 (see FIG. 5B) and the plurality of illumination images 320 (see FIG. 5B) obtained by the electronic device 100 of the disclosure. The training dataset may be a dataset including the plurality of captured images 400, the plurality of illumination images 320, and the characteristic information CI of the disclosure. In addition, in an embodiment of the disclosure, the training dataset may be a dataset including the input data 500*c* obtained by the electronic device 100 of the disclosure.

In an embodiment of the disclosure, the depth map generation module 134 may be trained to generate the depth map 600*b* from captured images of the target object 200, using the training dataset. The depth map generation module 134 may update weights of the encoder 135 and the decoder 136 using the training dataset. In an embodiment of the disclosure, the depth map generation module 134 may repeat a process of updating the weights of the encoder 135 and the decoder 136 multiple times using training data.

In an embodiment of the disclosure, each batch for training the depth map generation module 134 may include the plurality of preprocessed illumination images 520 and the plurality of preprocessed captured images 510. In an embodiment of the disclosure, the depth map generation module 134 may perform transfer learning using a pre-trained model, so as to learn to generate the depth map 600*b* using a training dataset. In an embodiment of the disclosure, DenseNet169, ResNet50, or the like may be used for the pre-trained model. The depth map generation module 134 may calculate a loss function of the artificial intelligence model included in the depth map generation module 134, using the pre-trained model to analyze the training data.

In an embodiment of the disclosure, the depth map generation module 134 may update the weights of the encoder 135 and the decoder 136, based on a loss value of the loss function. However, the disclosure is not limited thereto, and the depth map generation module 134 may receive, from an external server or nearby electronic devices, an artificial intelligence model previously trained using the training dataset.

Figure 9:
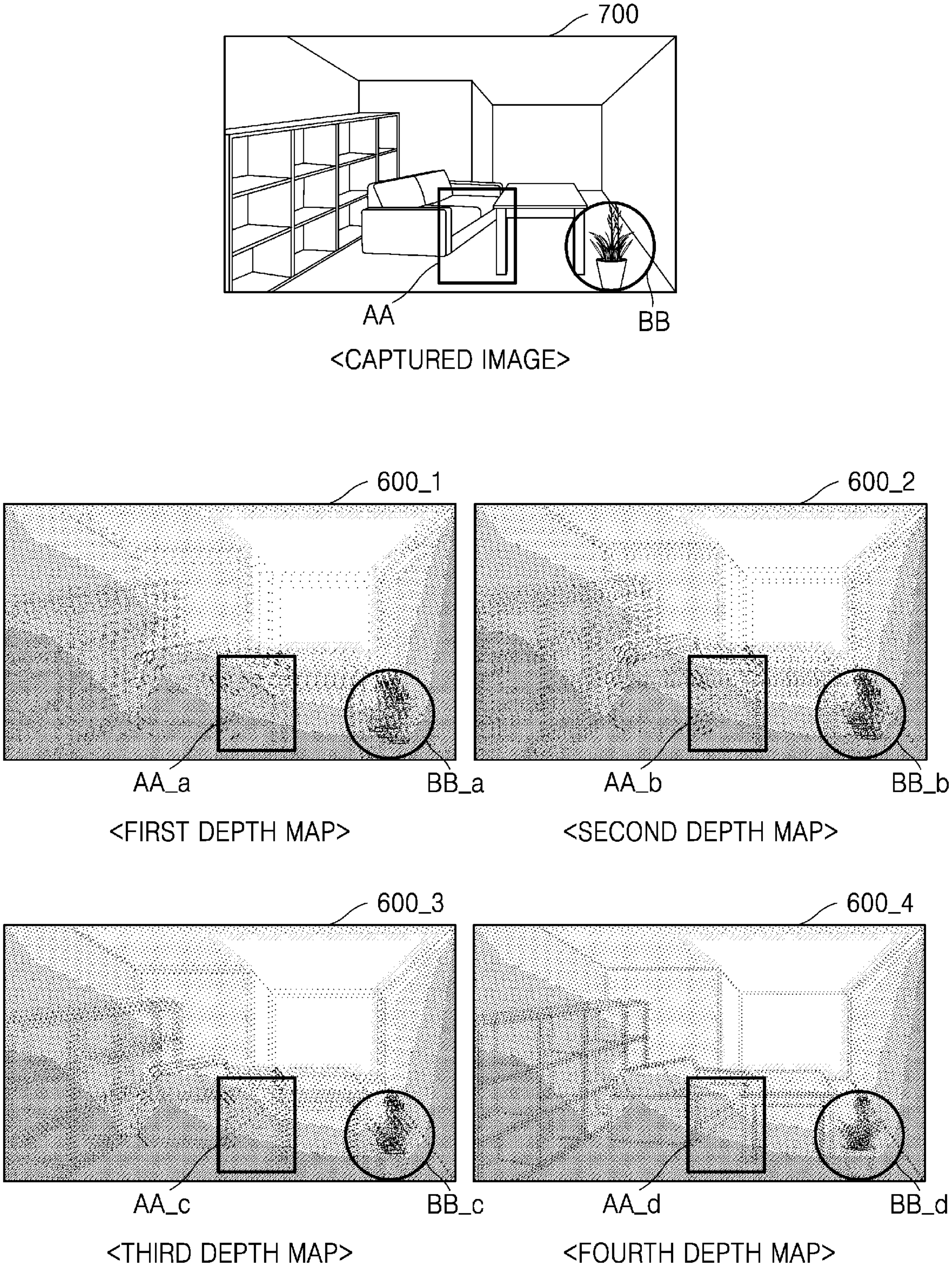
FIG. 9 is a diagram of a training process of a depth map generation module according to an embodiment of the disclosure.

FIG. 9 is a diagram of a training process of a depth map generation module according to an embodiment of the disclosure.

FIG. 9 illustrates a captured image 700 of the target object 200, a first depth map 600_1, a second depth map 600_2, a third depth map 600_3, and a fourth depth map 600_4 for describing a learning level of an artificial intelligence model. Referring to the captured image 700, the target object 200 includes a plurality of objects arranged at different positions from the measuring device 120 and having different shapes.

In an embodiment of the disclosure, the captured image 700 includes a first region AA including objects arranged adjacent to each other, and a second area BB including small objects that are difficult to be distinguished in a picture.

In an embodiment of the disclosure, the first depth map 600_1 is a depth map generated by the depth map generation module 134 that has repeated, for a 'j' number of times, learning based on the plurality of captured images 400 obtained through a process in which the light-emitting device 111 (see FIG. 1A) provides light in a constant pattern regardless of time, and the measuring device 120 photographs the target object 200 receiving the light.

In an embodiment of the disclosure, the second depth map 600_2 is a depth map generated by the depth map generation module 134 that has repeated, for a 'j' number of times, learning based on the plurality of captured images 400 obtained through a process in which the light-emitting device 111 provides light in a 'k' number of patterns that change over time, and the measuring device 120 photographs the target object 200 receiving the light.

In an embodiment of the disclosure, the third depth map 600_3 is a depth map generated by the depth map generation module 134 that has repeated, for a 'j' number of times, learning based on the plurality of captured images 400 obtained through a process in which the light-emitting device 111 provides light in an 'l' number of patterns that change over time, and the measuring device 120 photographs the target object 200 receiving the light.

In an embodiment of the disclosure, the fourth depth map 600_4 is a depth map generated by the depth map generation module 134 that has repeated, for an 'm' number of times, learning based on the plurality of captured images 400 obtained through a process in which the light-emitting device 111 provides light in an 'l' number of patterns that change over time, and the measuring device 120 photographs the target object 200 receiving the light. 'j', 'k', 'l' and 'm' may each be natural numbers, where 'm' is greater than 'j', and 'l' is greater than 'k'.

In an embodiment of the disclosure, it may be confirmed, by comparing the first depth map 600_1 with the second depth map 600_2, that when the depth map generation module 134 is trained based on the plurality of captured images 400 obtained by photographing the target object 200 while providing light to the target object 200 in patterns that change over time, the learning level of the artificial intelligence model increases.

For example, the resolution of a first region AA_b included in the second depth map 600_2 is higher than the resolution of a first area AA_a included in the first depth map 600_1, and thus, objects arranged adjacent to each other may be distinguished. In addition, the resolution of a second region BB_b included in the second depth map 600_2 is higher than the resolution of a second region BB_a included in the first depth map 600_1, and thus, small objects may be distinguished.

In an embodiment of the disclosure, it may be confirmed, by comparing the second depth map 600_2 with the third depth map 600_3, that as the number of patterns in which light is provided to the target object 200 increases, the learning level of the artificial intelligence model trained based on the plurality of captured images 400 increases.

For example, the resolution of a first region AA_c included in the third depth map 600_3 is higher than the resolution of the first area AA_b included in the second depth map 600_2, and thus, objects arranged adjacent to each other may be distinguished. In addition, the resolution of a second region BB_c included in the third depth map 600_3 is higher than the resolution of the second region BB_b included in the second depth map 600_2, and thus, small objects may be distinguished.

Thus, the resolution of the depth map 600*b* (see FIG. 8) generated by the artificial intelligence model trained based on the input data 500*c* (see FIG. 8) of the present disclosure is higher than the resolution of a depth map generated by an artificial intelligence model that trained based on images obtained by simply photographing the target object 200 without changing the pattern of light provided to the target object 200.

For example, the input data 500*c* of the disclosure includes information about changes in the shape of the shadows and the luminance of the target object 200 according to the arrangements, shapes, distances from the measuring device 120, and the like of objects included in the target object 200, and thus, the learning level of the artificial intelligence model trained based on the input data 500*c* may be higher. In addition, by training, based on the input data 500*c* of the disclosure, an artificial intelligence model for generating the depth map 600*b*, the artificial intelligence model may be trained with a smaller amount of training dataset than that in a case in which the artificial intelligence model is trained based on images obtained by simply photographing the target object 200 without changing the pattern of light provided to the target object 200.

In an embodiment of the disclosure, it may be confirmed, by comparing the third depth map 600_3 with the fourth depth map 600_4, that as the number of epochs, which is the number of times the depth map generation module 134 (see FIG. 8) is trained based on the input data 500*c*, increases, the learning level of the trained artificial intelligence model increases.

For example, the resolution of a first region AA_d included in the fourth depth map 600_4 is higher than the resolution of the first area AA_c included in the third depth map 600_3, and thus, objects arranged adjacent to each other may be distinguished. In addition, the resolution of a second region BB_d included in the fourth depth map 600_4 is higher than the resolution of the second region BB_c included in the third depth map 600_3, and thus, small objects may be distinguished.

Figure 10:
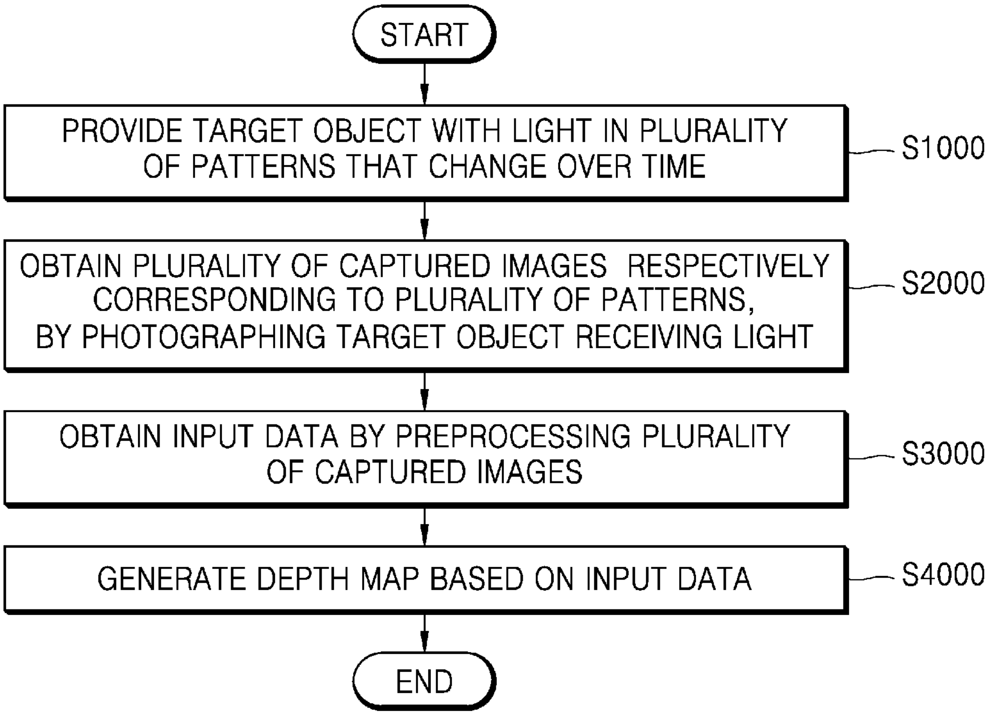
FIG. 10 is a flowchart of a method of generating a depth map using an electronic device including a light-emitting device, according to an embodiment of the disclosure.

FIG. 10 is a flowchart of a method of generating a depth map using an electronic device including a light-emitting device, according to an embodiment of the disclosure.

Referring to FIGS. 1A, 3A and 10, in operation S1000, the electronic device 100 may provide the target object 200 with light in the plurality of patterns (e.g., patterns 300) that change over time.

In an embodiment of the disclosure, the electronic device 100 provides the light to the target object 200 using the light-emitting device 111. The light-emitting device 111 provides the target object 200 with the light in the plurality of patterns 300 that change over time. In an embodiment of the disclosure, depending on the type of the electronic device 100, the light-emitting device 111 may perform a function of displaying an image or providing light to an environment surrounding the electronic device 100. When the electronic device 100 generates the depth map 600 (see FIG. 6) of the target object 200, the light-emitting device 111 provides the target object 200 with light in the plurality of patterns 300.

Referring to FIGS. 1A, 4, and 10, in operation S2000, the electronic device 100 obtains the plurality of captured images 400 respectively corresponding to the plurality of patterns 300, by photographing the target object 200 receiving the light.

In an embodiment of the disclosure, the electronic device 100 may obtain the plurality of captured images 400 using the measuring device 120 to photograph the target object 200. The measuring device 120 may photograph the target object 200 in synchronization with a change in the pattern of the light provided by the light-emitting device 111.

In an embodiment of the disclosure, the measuring device 120 may obtain the plurality of captured images 400 by photographing the target object 200, a shadow of which changes in response to changes in the pattern of the light received by the target object 200. In addition, the measuring device 120 may obtain the plurality of captured images 400 by photographing the target object 200, the luminance of which changes in response to the changes in the pattern of the light received by the target object 200.

In an embodiment of the disclosure, each of the plurality of captured images 400 includes changes in the shape of a shadow and the luminance of the target object 200 according to the changes in the pattern of the light.

In an embodiment of the disclosure, the measuring device 120 may be an RGB-depth camera configured to obtain an RGB image and a depth image. In an embodiment of the disclosure, measuring device 120 may use an Intel RealSense D455 camera. In this case, the plurality of captured images 400 may include RGB images and simple depth map images of the target object 200. However, the disclosure is not limited thereto, and the measuring device 120 may be an RGB camera configured to obtain an RGB image. In this case, the plurality of captured images 400 may include RGB images of the target object 200. Even in a case in which the plurality of captured images 400 do not include simple depth map images, the depth map 600 of the target object 200 may be generated through the image preprocessing module 133 and the depth map generation module 134.

Referring to FIGS. 1A, 5A, and 10, in operation S3000, the electronic device 100 obtains the input data 500*a* by preprocessing the plurality of captured images 400.

In an embodiment of the disclosure, the electronic device 100 may obtain the input data 500*a* using the image preprocessing module 133 (see FIG. 1B) to preprocess the plurality of captured images 400. In an embodiment of the disclosure, the input data 500*a* may include the plurality of preprocessed captured images 510.

In an embodiment of the disclosure, in a case in which the depth map generation module 134 includes an artificial intelligence model, the electronic device 100 may obtain the input data 500*a* using the image preprocessing module 133 to preprocess the plurality of captured images 400 such that the input data 500*a* includes information about epochs and batches.

Referring to FIGS. 1A, 6, and 10, in operation S4000, the electronic device 100 generates the depth map 600 based on the input data 500*a*.

In an embodiment of the disclosure, the electronic device 100 may generate the depth map 600 using the depth map generation module 134 (see FIG. 1B). The depth map generation module 134 generates the depth map 600 based on the input data 500*a*. In an embodiment of the disclosure, as the number of preprocessed captured images 510 included in the input data 500*a* increases, the resolution of the depth map 600 generated by the depth map generation module 134 may increase. In addition, in an embodiment of the disclosure, as the number of times the depth map generation module 134 refers to the input data 500*a* increases, the resolution of the generated depth map 600 may increase.

Figure 11:
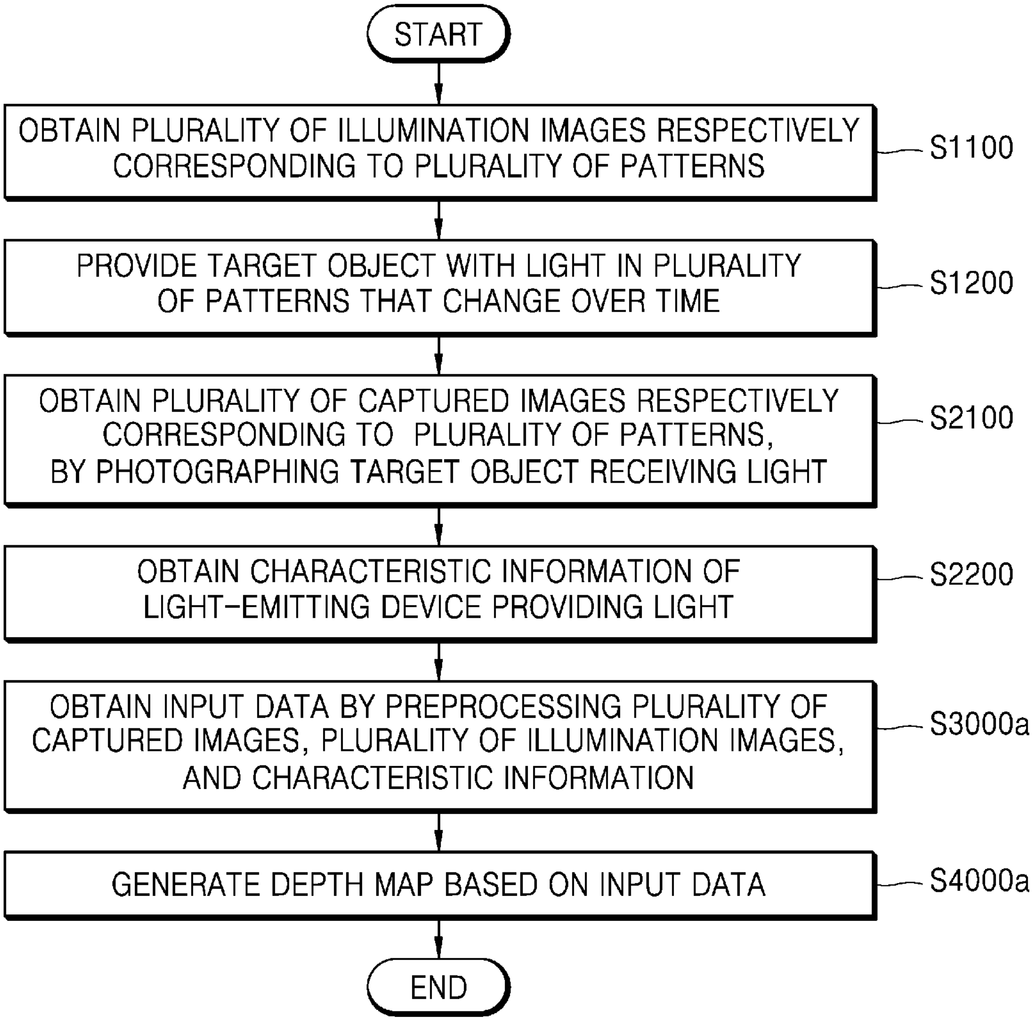
FIG. 11 is a flowchart of a method of generating a depth map based on input data obtained by preprocessing a plurality of captured images, a plurality of illumination images, and characteristic information, according to an embodiment of the disclosure.

FIG. 11 is a flowchart of a method of generating a depth map based on input data obtained by preprocessing a plurality of captured images, a plurality of illumination images, and characteristic information, according to an embodiment of the disclosure. Hereinafter, the same reference numerals are assigned to the same operations as those described above with reference to FIG. 10, and descriptions thereof may be omitted.

Referring to FIGS. 1A, 3A and 11, in operation S1100, the electronic device 100 may obtain the plurality of illumination images 320 (see FIG. 5C) respectively corresponding to the plurality of patterns 300.

In an embodiment of the disclosure, the electronic device 100 may obtain the plurality of illumination images 320 using an illumination measuring device to photograph the light-emitting device 111.

In an embodiment of the disclosure, the illumination measuring device may be installed on the opposite side of the light-emitting device 111, to photograph the plurality of patterns in which the light-emitting device 111 provides light. The illumination measuring device may obtain the plurality of illumination images 320 by photographing changes in the position, area, shape of the light-emitting region DA, the illumination of light, and the like according to changes in the pattern of the light provided by the light-emitting device 111. However, the disclosure is not limited thereto. In operation S1100, a plurality of previously captured illumination images 320 may be provided from an external server or nearby electronic devices, without measuring the light-emitting device 111 using the illumination measuring device.

Referring to FIGS. 1A, 3A, and 11, in operation S1200, the electronic device 100 may provide the target object 200 with light in the plurality of patterns that change over time.

Referring to FIGS. 1A, 4, and 11, in operation S2100, the electronic device 100 obtains the plurality of captured images 400 respectively corresponding to the plurality of patterns 300, by photographing the target object 200 receiving the light.

Referring to FIGS. 1A, 5C, and 11, in operation S2200, the electronic device 100 obtains the characteristic information CI of the light-emitting device 111 providing the light.

In an embodiment of the disclosure, the characteristic information CI may include information about the size of the light-emitting device 111, information about a position where the light-emitting device 111 is arranged, information about the distance between the light-emitting device 111 and the target object 200, information about the shape of the light-emitting device 111, information about the illumination of light provided by the light-emitting device 111, information about the direction of light provided by the light-emitting device 111, and the like. In an embodiment of the disclosure, the electronic device 100 may obtain the characteristic information CI from the light-emitting device 111 through the communication interface 150.

Referring to FIGS. 1A, 5C, and 11, in operation S3000*a*, the electronic device 100 obtains the input data 500*c* by preprocessing the plurality of captured images 400, the plurality of illumination images 320, and the characteristic information CI.

In an embodiment of the disclosure, the electronic device 100 may obtain the input data 500*c* using the image preprocessing module 133 (see FIG. 1B) to preprocess the plurality of captured images 400, the plurality of illumination images 320, and the characteristic information CI. In an embodiment of the disclosure, the input data 500*a* may include the plurality of preprocessed captured images 510, the plurality of preprocessed illumination images 520, and the preprocessed characteristic information 530.

In an embodiment of the disclosure, in a case in which the depth map generation module 134 includes an artificial intelligence model, the electronic device 100 may obtain the input data 500*c* using the image preprocessing module 133 to preprocess the plurality of captured images 400, the plurality of illumination images 320, and the characteristic information CI such that the input data 500*c* includes information about epochs and batches.

Referring to FIGS. 1A, 7B, and 11, in operation S4000*a*, the electronic device 100 generates the depth map 600 based on the input data 500*c*.

In an embodiment of the disclosure, the electronic device 100 may generate the depth map 600 using the depth map generation module 134 (see FIG. 1B). In an embodiment of the disclosure, as the number of preprocessed illumination images 520 and preprocessed captured images 510 included in the input data 500*c* increases, the resolution of the depth map 600 generated by the depth map generation module 134 may increase. In addition, the depth map generation module 134 may generate the depth map 600 with high resolution, based on the preprocessed characteristic information 530 including information about the light-emitting device 111.

In an embodiment of the disclosure, in a case in which the preprocessed characteristic information 530 includes information about the size of the light-emitting device 111, the depth map generation module 134 may obtain the incident angle of light provided to the target object 200, the luminance of the light, the area of the light-emitting region DA, and the like, based on the plurality of preprocessed illumination images 520 and the preprocessed characteristic information 530.

In an embodiment of the disclosure, the depth map generation module 134 may generate the depth map 600 based on obtained information of the light and the plurality of preprocessed captured images 510. In this case, the target object 200 may include one or more objects. Changes in the shape of a shadow and the luminance of the target object 200 according to changes in the pattern of the light provided to the target object 200 are determined according to the distance between each object and the light-emitting device 111, the shape of each object, and the like. However, the disclosure is not limited thereto, and in a case in which the preprocessed characteristic information 530 further includes information about other characteristics of the light-emitting device 111, the number of pieces of information about the pattern of the light provided to the target object 200 identified by the depth map generation module 134 may increase.

Figure 12:
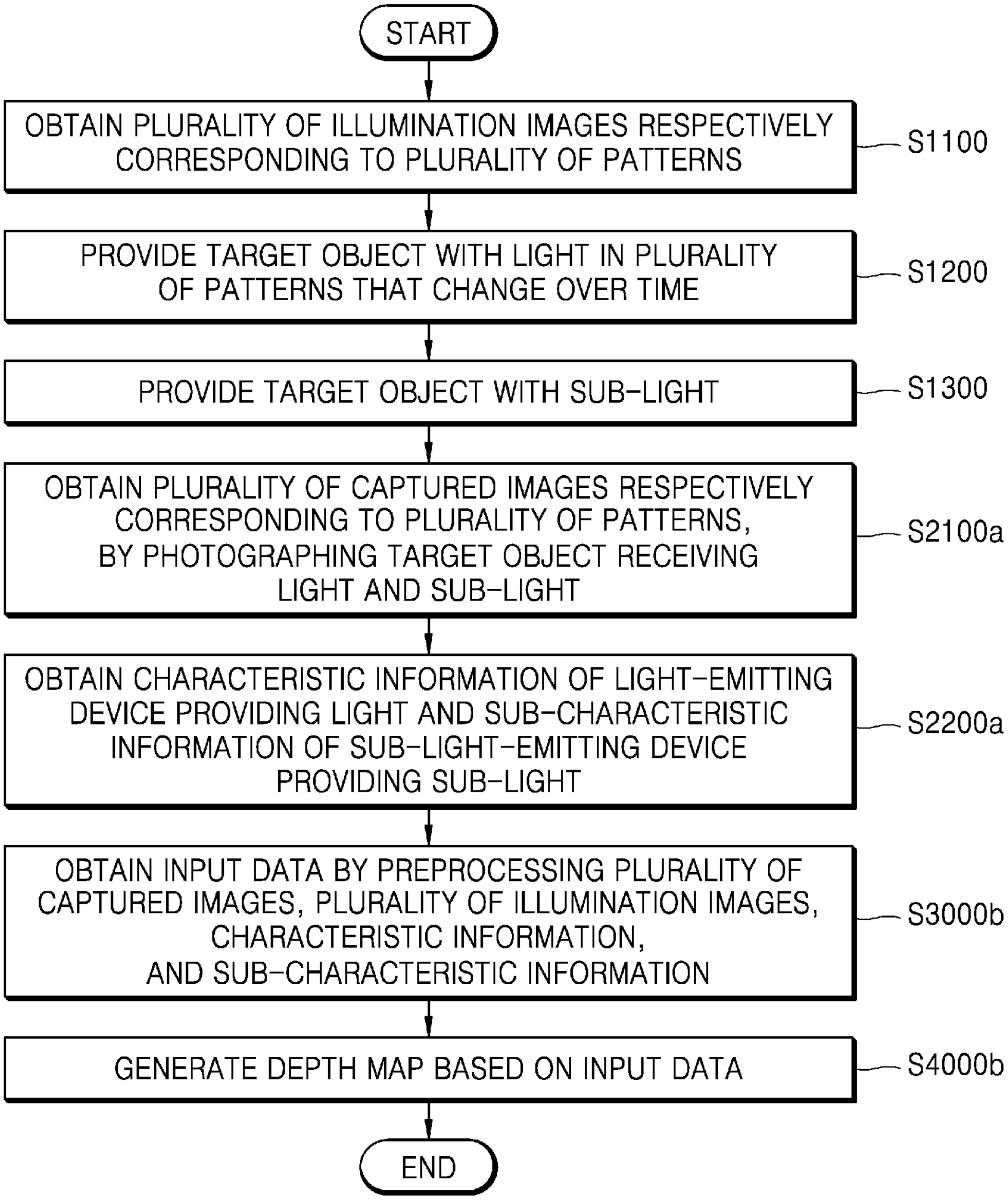
FIG. 12 is a flowchart of a method of generating a depth map using an electronic device including a light-emitting device and a sub-light-emitting device, according to an embodiment of the disclosure.

FIG. 12 is a flowchart of a method of generating a depth map using an electronic device including a light-emitting device and a sub-light-emitting device, according to an embodiment of the disclosure. Hereinafter, the same reference numerals are assigned to the same operations as those described above with reference to FIGS. 10 and 11, and descriptions thereof may be omitted.

Referring to FIGS. 2A, 3A and 12, in operation S1100, the electronic device 100 may obtain the plurality of illumination images 320 (see FIG. 5C) respectively corresponding to the plurality of patterns 300.

Referring to FIGS. 2A, 3A, and 12, in operation S1200, the electronic device 100 may provide the target object 200 with light in the plurality of patterns that change over time.

Referring to FIGS. 2A and 12, in operation S1300, the electronic device 100 may provide sub-light to the target object 200.

In an embodiment of the disclosure, the electronic device 100 may provide the sub-light to the target object 200 using the sub-light-emitting device 112. In an embodiment of the disclosure, the sub-light-emitting device 112 may provide the target object 200 with sub-light in the plurality of patterns 300 that change over time. In this case, the patterns in which the sub-light-emitting device 112 provides the sub-light may be different from the patterns in which the light-emitting device 111 provides the light. In addition, the sub-light-emitting device 112 may provide the target object 200 with sub-light in a constant pattern regardless of time.

In an embodiment of the disclosure, depending on the type of the electronic device 100, in normal times, the sub-light-emitting device 112 may perform a function of providing light necessary for the electronic device 100 to perform its function or providing light to an environment surrounding the electronic device 100. The sub-light-emitting device 112 provides sub-light to the target object 200 when the electronic device 100 generates the depth map 600 (see FIG. 6) of the target object 200.

In an embodiment of the disclosure, the electronic device 100 may obtain a plurality of sub-illumination images using the illumination measuring device to photograph the sub-light-emitting device 112. The plurality of sub-illumination images may correspond to a plurality of patterns of the sub-light, respectively.

Referring to FIGS. 2A, 4, and 12, in operation S2100*a*, the electronic device 100 obtains the plurality of captured images 400 respectively corresponding to the plurality of patterns 300, by photographing the target object 200 receiving the light and the sub-light.

Referring to FIGS. 2A, 5D, and 12, in operation S2200, the electronic device 100 obtains the characteristic information CI of the light-emitting device 111 providing the light, and the sub-characteristic information SCI of the sub-light-emitting device 112 providing the sub-light.

In an embodiment of the disclosure, the characteristic information CI may include information about the size of the light-emitting device 111 and the like. The sub-characteristic information SCI may include information about the size of the sub-light-emitting device 112, information about a position where the sub-light-emitting device 112 is arranged, information about the distance between the sub-light-emitting device 112 and the target object 200, information about the shape of the sub-light-emitting device 112, information about the illumination of light provided by the sub-light-emitting device 112, information about the direction of light provided by the sub-light-emitting devices 112, information about the number of sub-light-emitting devices 112, and the like.

In an embodiment of the disclosure, the electronic device 100 may obtain the characteristic information CI from the light-emitting device 111, and obtain the sub-characteristic information SCI from the sub-light-emitting device 112, through the communication interface 150.

Referring to FIGS. 2A, 5D and 12, in operation S3000*b*, the electronic device 100 obtains the input data 500*d* by preprocessing the plurality of captured images 400, the plurality of illumination images 320, the characteristic information CI, and the sub-characteristic information SCI.

In an embodiment of the disclosure, the electronic device 100 may obtain the input data 500*d* using the image preprocessing module 133*a* (see FIG. 2B) to preprocess the plurality of captured images 400, the plurality of illumination images 320, the characteristic information CI, and the sub-characteristic information SCI.

In an embodiment of the disclosure, the input data 500*d* may include the plurality of preprocessed captured images 510, the plurality of preprocessed illumination images 520, the preprocessed characteristic information 530, and the preprocessed sub-characteristic information 540. In an embodiment of the disclosure, the image preprocessing module 133*a* may further obtain a plurality of sub-illumination images. The image preprocessing module 133*a* may also obtain input data by preprocessing the plurality of captured images 400, the plurality of illumination images 320, the plurality of sub-illumination images, the characteristic information CI, and the sub-characteristic information SCI.

Referring to FIGS. 2A and 12, in operation S4000*b*, the electronic device 100 generates the depth map 600 based on the input data 500*d.*

In an embodiment of the disclosure, the electronic device 100 may generate the depth map 600 using the depth map generation module 134*a* (see FIG. 2B). In an embodiment of the disclosure, the depth map generation module 134*a* may generate the depth map 600 with high resolution, based on the preprocessed characteristic information 530 and the preprocessed sub-characteristic information 540.

In an embodiment of the disclosure, in a case in which the preprocessed characteristic information 530 includes information about the size of the light-emitting device 111 and the preprocessed sub-characteristic information 540 includes information about the position of the sub-light-emitting device 112, the depth map generation module 134*a* may obtain information of light and sub-light provided to the target object 200, based on the plurality of preprocessed illumination images 520, the preprocessed characteristic information 530, and the preprocessed sub-characteristic information 540. The depth map generation module 134*a* may generate the depth map 600 with high resolution, based on the obtained information of the light and the sub-light, and the plurality of preprocessed captured images 510.

Figure 13:
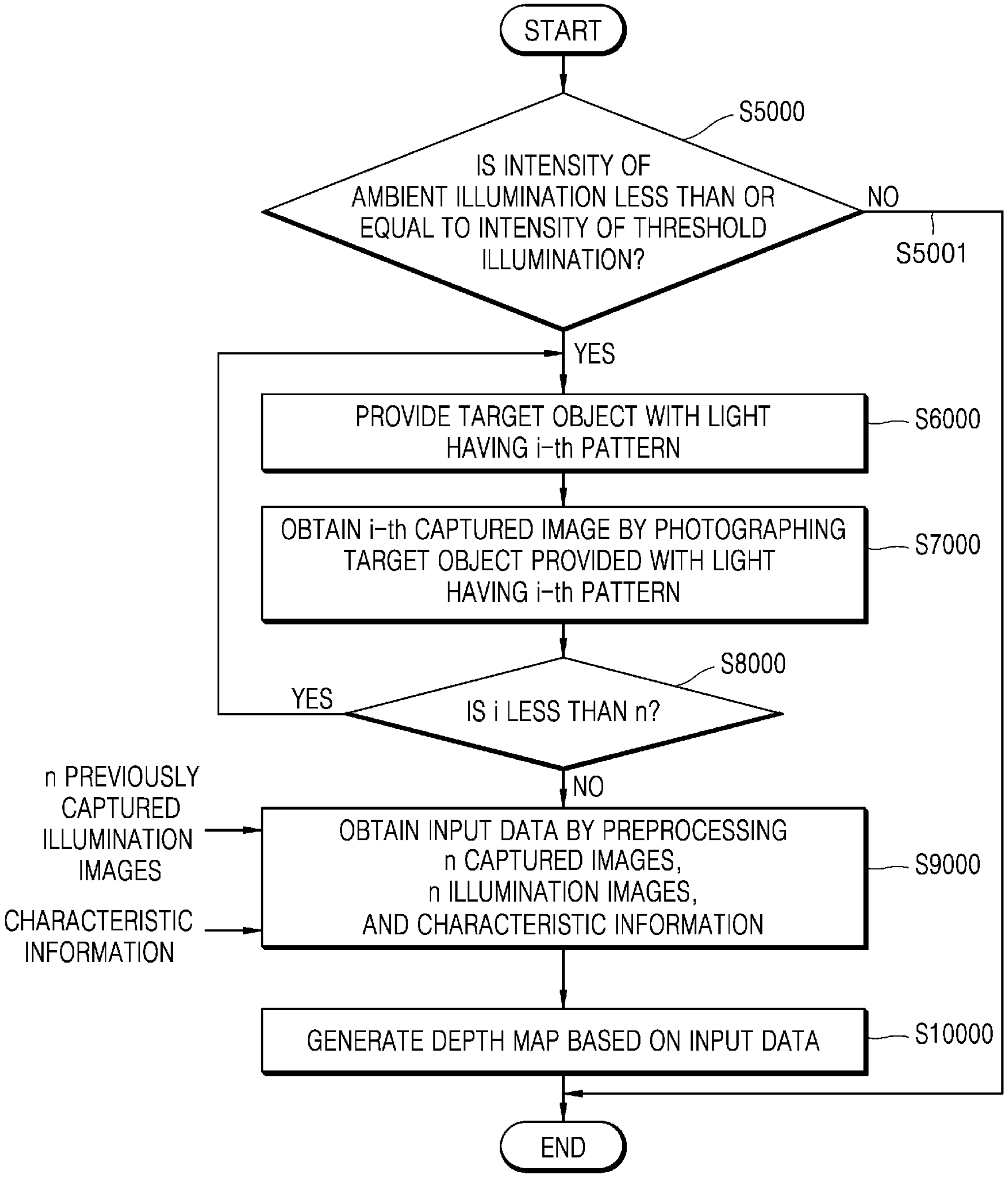
FIG. 13 is a flowchart of an operation, performed by an electronic device, of generating a depth map corresponding to input data, according to an embodiment of the disclosure.

FIG. 13 is a flowchart of an operation, performed by an electronic device, of generating a depth map corresponding to input data, according to an embodiment of the disclosure.

Referring to FIGS. 1A, 4, and 13, when a threshold illumination is the maximum illumination at which the plurality of captured images 400 reflecting changes in the plurality of patterns 300 that change over time may be obtained, in operation S5000, the electronic device 100 compares the intensity of the ambient illumination of the target object 200, with the intensity of the threshold illumination.

In an embodiment of the disclosure, in operation S5000, the electronic device 100 determines whether the intensity of the ambient illumination of the target object 200 is less than or equal to the intensity of the threshold illumination. In an embodiment of the disclosure, in a case in which the intensity of the ambient illumination of the target object 200 is greater than the intensity of the threshold illumination, the measuring device 120 is unable to obtain the plurality of captured images 400 including changes in the shape of a shadow or the luminance of the target object 200 according to changes in the pattern of light provided by the light-emitting device 111. Accordingly, because the electronic device 100 is unable to generate the depth map 600 according to the disclosure, the electronic device 100 terminates the operation of generating the depth map 600 in operation S5001.

In an embodiment of the disclosure, in a case in which the intensity of the ambient illumination of the target object 200 is less than or equal to the intensity of the threshold illumination, the electronic device 100 performs the operation of generating the depth map 600. In an embodiment of the disclosure, the intensity of the threshold illumination may vary depending on the performance of the light-emitting device 111 or the performance of the measuring device 120. As the illumination of light that may be provided by the light-emitting device 111 increases, the intensity of the threshold illumination may also increase. In addition, as the performance of the measuring device 120 for photographing a change in the shape of a shadow or the luminance of the target object 200 improves, the intensity of the threshold illumination may also increase.

Referring to FIGS. 1A, 3A, and 13, in an embodiment of the disclosure, in a case in which the plurality of patterns 300 in which the light-emitting device 111 provides light include 'n' patterns, in operation S6000, the electronic device 100 provides the target object 200 with light having an i-th pattern using the light-emitting device 111. 'i' may be a natural number less than or equal to 'n'.

In an embodiment of the disclosure, at least one of the positions, areas, or shapes of the light-emitting regions DA included in the respective 'n' patterns may be different from each other. In an embodiment of the disclosure, the illuminations of light of the 'n' patterns may be different from each other.

Referring to FIGS. 1A, 4, and 13, in an embodiment of the disclosure, in operation S7000, the electronic device 100 may obtain an i-th captured image by photographing the target object 200 provided with the light having the i-th pattern. The i-th captured image is a captured image corresponding to the light having the i-th pattern. In an embodiment of the disclosure, in operation S7000, the electronic device 100 may obtain the i-th captured image using the measuring device 120. In an embodiment of the disclosure, in a case in which the plurality of patterns includes 'n' patterns, the electronic device 100 may obtain 'n' captured images 400.

In operation S8000, the electronic device 100 determines whether 'i' is less than 'n'. In an embodiment of the disclosure, in a case in which "' is less than 'n', the electronic device 100 returns to operation S6000 to provide light to the target object 200 again. In this case, the electronic device 100 may provide the target object 200 with light in an (i+1)-th pattern. Thereafter, in operation S7000, the electronic device 100 may obtain an (i+1)-th captured image by photographing the target object 200 provided with the light having the (i+1)-th pattern. Thereafter, the electronic device 100 determines whether i+1 is less than 'n', and in a case in which i+1 is less than 'n', the electronic device 100 repeats the above operations.

In an embodiment of the disclosure, when 'i' is equal to 'n', the measuring device 120 may obtain 'n' captured images 400 respectively corresponding to 'n' patterns 300 provided to the target object 200 through the light-emitting device 111.

Referring to FIGS. 1A, 5C, and 13, in operation S9000, the electronic device 100 is provided with 'n' illumination images 320 corresponding to the 'n' patterns 300 in which the light-emitting device 111 provides the light. The 'n' illumination images 320 corresponds to the 'n' patterns 300, respectively.

In an embodiment of the disclosure, the 'n' illumination images 320 may be images previously captured before the operation, performed by the electronic device 100, of generating the depth map 600. The electronic device 100 may receive a plurality of previously captured illumination images 320, from an external server or nearby electronic devices through the communication interface 150 (see FIG. 1B).

In an embodiment of the disclosure, the 'n' illumination images 320 may be images captured in the operation, performed by the electronic device 100, of providing the light in the 'n' patterns in order to generate the depth map 600. The electronic device 100 is provided with the characteristic information CI of the light-emitting device 111.

In an embodiment of the disclosure, the characteristic information CI may include information about the size of the light-emitting device 111. The electronic device 100 may obtain the input data 500*c* by preprocessing the 'n' captured images 400, the 'n' illumination images 320, and the characteristic information CI.

Referring to FIGS. 1A, 7B, and 13, in operation S10000, the electronic device 100 may generate the depth map 600 based on the input data 500*c*.

In an embodiment of the disclosure, using the generated depth map 600, the electronic device 100 may perform operations of, for example, providing an augmented reality (AR) experience using the electronic device 100, allowing, using AR, a user to place furniture, home appliances, and the like in an environment where the electronic device 100 is arranged, identifying the distance between the electronic device 100 and the user using the electronic device 100, and adjusting the size of an image used in the electronic device 100 considering the viewing angle of the user. In addition, in an embodiment of the disclosure, using the depth map 600, the electronic device 100 may perform operations such as three-dimensional (3D) modeling, vehicle navigation, object recognition, and human gesture detection. However, the disclosure is not limited thereto. In an embodiment of the disclosure, the electronic device 100 of the disclosure may provide the generated depth map 600 to nearby electronic devices. The nearby electronic devices may perform, based on the provided depth map 600, operations such as provision of an AR experience, 3D modeling, vehicle navigation, object recognition, and human gesture detection.

A program executable by the electronic device 100 described herein may be implemented as a hardware component, a software component, and/or a combination of hardware components and software components. The program is executable by any system capable of executing computer-readable instructions.

The software may include a computer program, code, instructions, or a combination of one or more thereof, and may configure the processor to operate as desired or may independently or collectively instruct the processor.

The software may be implemented as a computer program that includes instructions stored in computer-readable storage media. The computer-readable storage media may include, for example, magnetic storage media (e.g., ROM, RAM, floppy disks, hard disks, etc.) and optical storage media (e.g., a compact disc ROM (CD-ROM), a digital video disc (DVD), etc.). The computer-readable recording medium may be distributed in computer systems connected via a network and may store and execute computer-readable code in a distributed manner. The recording medium may be computer-readable, may be stored in a memory, and may be executed by a processor.

The computer-readable storage medium may be provided in the form of a non-transitory storage medium. The term 'non-transitory storage medium' may refer to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

In addition, a program according to an embodiment of the disclosure may be provided in a computer program product. The computer program products may be traded as commodities between sellers and buyers.

The computer program product may include a software program and a computer-readable recording medium storing the software program. For example, the computer program product may include a product (e.g., a downloadable application) in the form of a software program electronically distributed through a manufacturer of the electronic device 100 or an electronic market (e.g., Samsung Galaxy Store). For electronic distribution, at least part of the software program may be stored in a storage medium or temporarily generated. In this case, the storage medium may be a storage medium of a server of the manufacturer of the electronic device 100, a server of the electronic market, or a relay server that temporarily stores the software program.

Although embodiments of the disclosure have been described with the limited embodiment and the drawings, various modifications and changes may be made by those of skill in the art from the above description. For example, suitable results may be obtained even when the described techniques are performed in a different order, or when components in a described electronic device, architecture, device, or circuit are coupled or combined in a different manner, or replaced or supplemented by other components or their equivalents.

What is claimed is:

1. A method of generating a depth map corresponding to input data, the method comprising:

providing light to a target object in a plurality of patterns that change over time;

obtaining a plurality of captured images respectively corresponding to the plurality of patterns, by photographing the target object to which the light is provided;

obtaining a plurality of illumination images respectively corresponding to the plurality of patterns by photographing a light-emitting device configured to provide the light;

obtaining the input data by preprocessing the plurality of captured images and the plurality of illumination images; and generating the depth map based on the input data.

2. The method of claim 1, wherein each of the plurality of patterns comprises a light-emitting region to which the light is provided, and wherein a position of the light-emitting region changes over time.

3. The method of claim 1, wherein each of the plurality of patterns comprises a light-emitting region to which the light is provided, and wherein an area of at least a partial region of the light-emitting region changes over time.

4. The method of claim 1, wherein an illumination of the light in each of the plurality of patterns changes over time.

5. The method of claim 1, further comprising obtaining characteristic information of the light-emitting device, wherein the obtaining of the input data comprises obtaining the input data by preprocessing the plurality of captured images, the plurality of illumination images, and the characteristic information.

6. The method of claim 5, wherein the characteristic information comprises information about a size of the light-emitting device.

7. The method of claim 5, further comprising:

providing sub-light to the target object; and obtaining sub-characteristic information of a sub-light-emitting device configured to provide the sub-light, wherein the obtaining of the plurality of captured images comprises obtaining the plurality of captured images by photographing the target object to which the light and the sub-light are provided, and wherein the obtaining of the input data comprises obtaining the input data by preprocessing the plurality of captured images, the plurality of illumination images, the characteristic information, and the sub-characteristic information.

8. The method of claim 1, further comprising comparing an intensity of an ambient illumination of the target object with an intensity of a threshold illumination, wherein the light is provided to the target object based on the intensity of the ambient illumination being less than or equal to the intensity of the threshold illumination, and wherein the threshold illumination is a maximum illumination at which the plurality of captured images reflecting changes in the plurality of patterns that change over time are able to be obtained.

9. The method of claim 1, wherein the generating of the depth map comprises generating the depth map by providing a depth map generation module with the input data, and wherein the depth map generation module comprises an autoencoder.

10. An electronic device for generating a depth map corresponding to input data, the electronic device comprising:

a light-emitting device configured to provide light to a target object in a plurality of patterns that change over time;

a measuring device comprising at least one camera configured to obtain a plurality of captured images respectively corresponding to the plurality of patterns by photographing the target object to which the light is provided;

a memory storing one or more instructions; and at least one processor configured to execute the one or more instructions stored in the memory to:

receive a plurality of illumination images that are previously captured, the plurality of illumination images being obtained by photographing the light-emitting device, the plurality of illumination images respectively corresponding to the plurality of patterns;

obtain the input data by preprocessing the plurality of captured images and the plurality of illumination images, and generate the depth map based on the input data.

11. The electronic device of claim 10, wherein each of the plurality of patterns comprises a light-emitting region to which the light is provided, and wherein a position of the light-emitting region changes over time.

12. The electronic device of claim 10, wherein each of the plurality of patterns comprises a light-emitting region to which the light is provided, and wherein an area of at least a partial region of the light-emitting region changes over time.

13. The electronic device of claim 10, wherein an illumination of the light in each of the plurality of patterns changes over time.

14. The electronic device of claim 10, wherein the at least one processor is further configured to execute the one or more instructions to receive characteristic information of the light-emitting device, and obtain the input data by preprocessing the plurality of captured images, the plurality of illumination images, and the characteristic information.

15. The electronic device of claim 14, wherein the characteristic information comprises information about a size of the light-emitting device.

16. The electronic device of claim 14, further comprising a sub-light-emitting device configured to provide sub-light to the target object, wherein the measuring device is further configured to obtain the plurality of captured images by photographing the target object to which the light and the sub-light are provided, and wherein the at least one processor is further configured to execute the one or more instructions to receive sub-characteristic information of the sub-light-emitting device, and obtain the input data by preprocessing the plurality of captured images, the plurality of illumination images, the characteristic information, and the sub-characteristic information.

17. The electronic device of claim 10, wherein the at least one processor is further configured to execute the one or more instructions to generate the depth map by providing a depth map generation module with the input data, and wherein the depth map generation module comprises an autoencoder.

18. A non-transitory computer-readable recording medium storing instructions that, when executed by at least one processor, cause the at least one processor to:

provide light toward a target object in a plurality of patterns that change over time;

obtain a plurality of captured images respectively corresponding to the plurality of patterns, by photographing the target object toward which the light is provided;

obtain a plurality of illumination images respectively corresponding to the plurality of patterns by photographing a light-emitting device configured to provide the light;

obtain input data by preprocessing the plurality of captured images and the plurality of illumination images; and generate a depth map based on the input data.

* * * * *